US012641502B2

(12) United States Patent
Bai et al.

(10) Patent No.: US 12,641,502 B2
(45) Date of Patent: May 26, 2026

(54) REFERENCE CELL CONFIGURATION

(71) Applicant: QUALCOMM Incorporated, San Diego, CA (US)

(72) Inventors: Tianyang Bai, Somerville, NJ (US); Yan Zhou, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 663 days.

(21) Appl. No.: 18/157,753

(22) Filed: Jan. 20, 2023

(65) Prior Publication Data

US 2024/0251309 A1      Jul. 25, 2024

(51) Int. Cl.
H04W 4/00          (2018.01)
H04W 36/00        (2009.01)
H04W 36/32        (2009.01)

(52) U.S. Cl.
CPC . H04W 36/00835 (2018.08); H04W 36/0061 (2013.01); H04W 36/324 (2023.05)

(58) Field of Classification Search
CPC ....... H04W 36/00835; H04W 36/0061; H04W 36/324
USPC .......................................................... 370/331
See application file for complete search history.

(56) References Cited

U.S. PATENT DOCUMENTS 9,838,190 B2 * 12/2017 Wang ..................... H04L 5/0078
11,330,483 B2 * 5/2022 Bergqvist .......... H04W 36/0077

11,412,429 B2 * 8/2022 Hwang ............... H04W 36/362
11,700,571 B2 * 7/2023 Liu ........................ H04W 76/19
                                                                    370/329
11,729,681 B2 * 8/2023 Susitaival ........... H04W 36/362
                                                                    370/331
11,736,995 B2 * 8/2023 Han ...................... H04L 5/0055
                                                                    370/331
12,022,339 B2 * 6/2024 Zhang ..................... H04L 5/001
12,323,817 B2 * 6/2025 Da Silva ............. H04W 36/249
12,382,465 B2 * 8/2025 Kim ................... H04W 72/1268
2017/0222876 A1 * 8/2017 Van Der Velde ... H04W 12/041
2022/0295480 A1 * 9/2022 Xu ........................ H04L 5/0091
2023/0130286 A1 * 4/2023 Leng ................. H04W 36/0058
                                                                    370/331

(Continued)

OTHER PUBLICATIONS

International Search Report and Written Opinion—PCT/US2023/083611—ISA/EPO—Apr. 18, 2024.

(Continued)

*Primary Examiner* — Amancio Gonzalez
(74) *Attorney, Agent, or Firm* — Holland & Hart LLP

(57)          ABSTRACT

Methods, systems, and devices for reference cell configuration are described. A user equipment (UE) may receive a signal indicating a delta cell configuration for each candidate cell in a set of one or more candidate cells, the set of one or more candidate cells associated with a reference cell configuration. The UE may monitor for transmissions from candidate cells in the set of one or more candidate cells to identify a target cell, the target cell comprising a candidate cell from the set of one or more candidate cells. The UE may perform a cell mobility procedure with the target cell using the delta cell configuration of the candidate cell and the reference cell configuration of the set of one or more candidate cells.

30 Claims, 16 Drawing Sheets

(56)　　　　　References Cited

U.S. PATENT DOCUMENTS

| | | | | |
|---|---|---|---|---|
| 2023/0134087 | A1* | 5/2023 | Zhang | H04W 48/16 |
| | | | | 370/329 |
| 2023/0354371 | A1* | 11/2023 | Huang | H04W 72/232 |
| 2024/0040463 | A1* | 2/2024 | Haustein | H04W 36/30 |
| 2024/0114523 | A1* | 4/2024 | Lee | H04W 72/23 |
| 2024/0334263 | A1* | 10/2024 | Zhang | H04W 36/0061 |
| 2024/0334270 | A1* | 10/2024 | Zhang | H04W 36/00835 |
| 2024/0373304 | A1* | 11/2024 | Zhang | H04W 36/0085 |
| 2024/0406811 | A1* | 12/2024 | Zhang | H04W 36/04 |
| 2025/0142427 | A1* | 5/2025 | Freda | H04W 36/00835 |
| 2025/0220448 | A1* | 7/2025 | Da Silva | H04W 36/249 |

OTHER PUBLICATIONS

Lecompte D (Huawei)., et al., "Configuration of Candidate Target Configurations (Pre-configurations) for LTM", 3GPP TSG-RAN2 Meeting #120, R2-2212069, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 5 Pages, XP052216158, p. 4, paragraph 2.2.

Zhang M., et al., "Discussion on Candidate Cell Configuration and Maintenance", 3GPP TSG-RAN WG2 Meeting #120, R2-2211794, 3rd Generation Partnership Project, Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 9 pages, XP052215898, the whole document.

Zou J (Futurewei)., et al., "Configuration Maintenance and Update for Subsequent HOs", 3GPP TSG-RAN WG2 Meeting #120, R2-22111498, 3rd Generation Partnership Project (3GPP), Mobile Competence Centre, 650, Route Des Lucioles, F-06921 Sophia-Antipolis Cedex, France, vol. 3GPP RAN 2, No. Toulouse, FR, Nov. 14, 2022-Nov. 18, 2022, Nov. 4, 2022, 5 pages, XP052215606, the whole document.

* cited by examiner

Candidate
Cell

215

Serving
Cell

210

Candidate
(Target)
Cell

220

205

Movement

Candidate
Cell

225

200

| Receiver | Communications Manager | Transmitter |

410                    420                    415

405

400

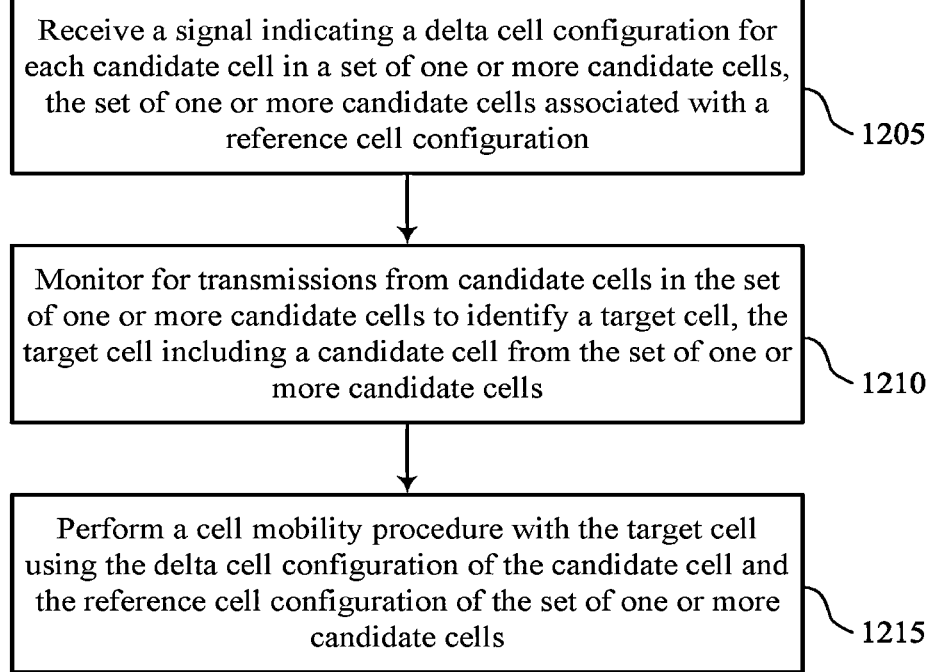

Receive a signal indicating a delta cell configuration for each candidate cell in a set of one or more candidate cells, the set of one or more candidate cells associated with a reference cell configuration

1205

Monitor for transmissions from candidate cells in the set of one or more candidate cells to identify a target cell, the target cell including a candidate cell from the set of one or more candidate cells

1210

Perform a cell mobility procedure with the target cell using the delta cell configuration of the candidate cell and the reference cell configuration of the set of one or more candidate cells

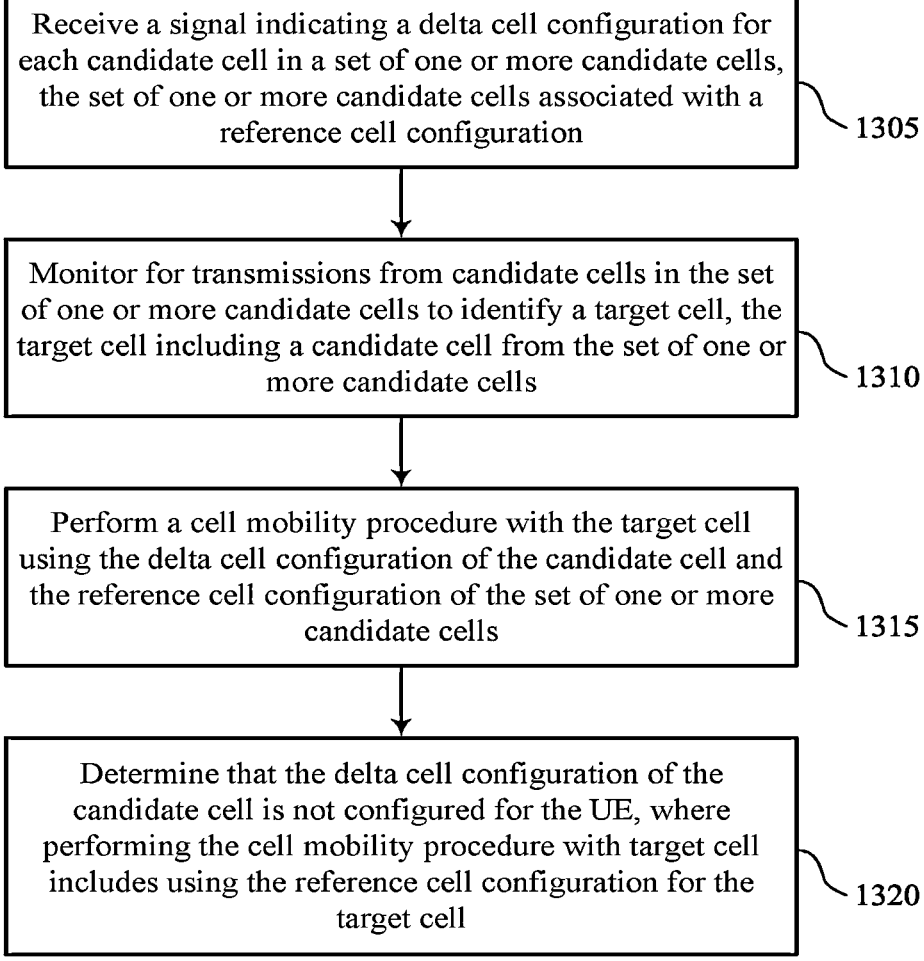

Receive a signal indicating a delta cell configuration for each candidate cell in a set of one or more candidate cells, the set of one or more candidate cells associated with a reference cell configuration

1305

Monitor for transmissions from candidate cells in the set of one or more candidate cells to identify a target cell, the target cell including a candidate cell from the set of one or more candidate cells

1310

Perform a cell mobility procedure with the target cell using the delta cell configuration of the candidate cell and the reference cell configuration of the set of one or more candidate cells

1315

Determine that the delta cell configuration of the candidate cell is not configured for the UE, where performing the cell mobility procedure with target cell includes using the reference cell configuration for the target cell

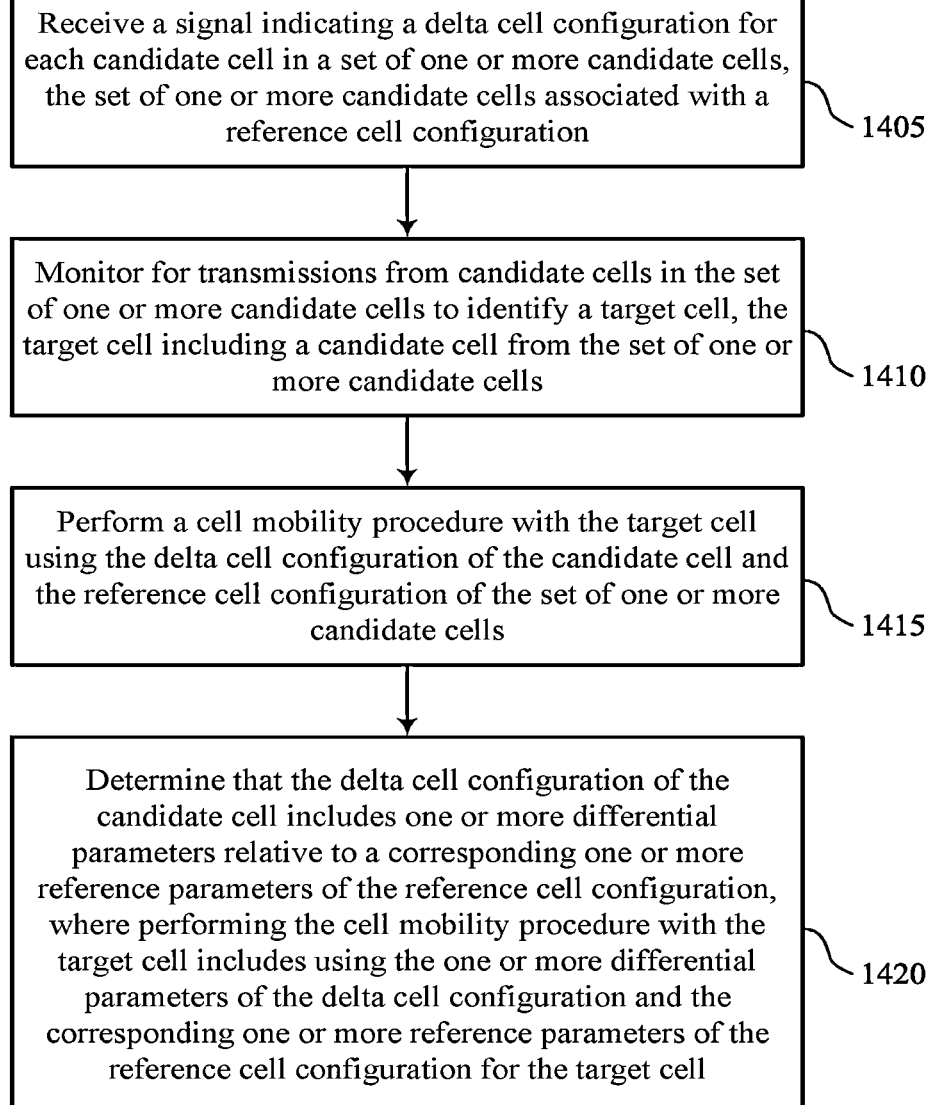

Receive a signal indicating a delta cell configuration for each candidate cell in a set of one or more candidate cells, the set of one or more candidate cells associated with a reference cell configuration

1405

Monitor for transmissions from candidate cells in the set of one or more candidate cells to identify a target cell, the target cell including a candidate cell from the set of one or more candidate cells

1410

Perform a cell mobility procedure with the target cell using the delta cell configuration of the candidate cell and the reference cell configuration of the set of one or more candidate cells

1415

Determine that the delta cell configuration of the candidate cell includes one or more differential parameters relative to a corresponding one or more reference parameters of the reference cell configuration, where performing the cell mobility procedure with the target cell includes using the one or more differential parameters of the delta cell configuration and the corresponding one or more reference parameters of the reference cell configuration for the target cell

Figure 15:
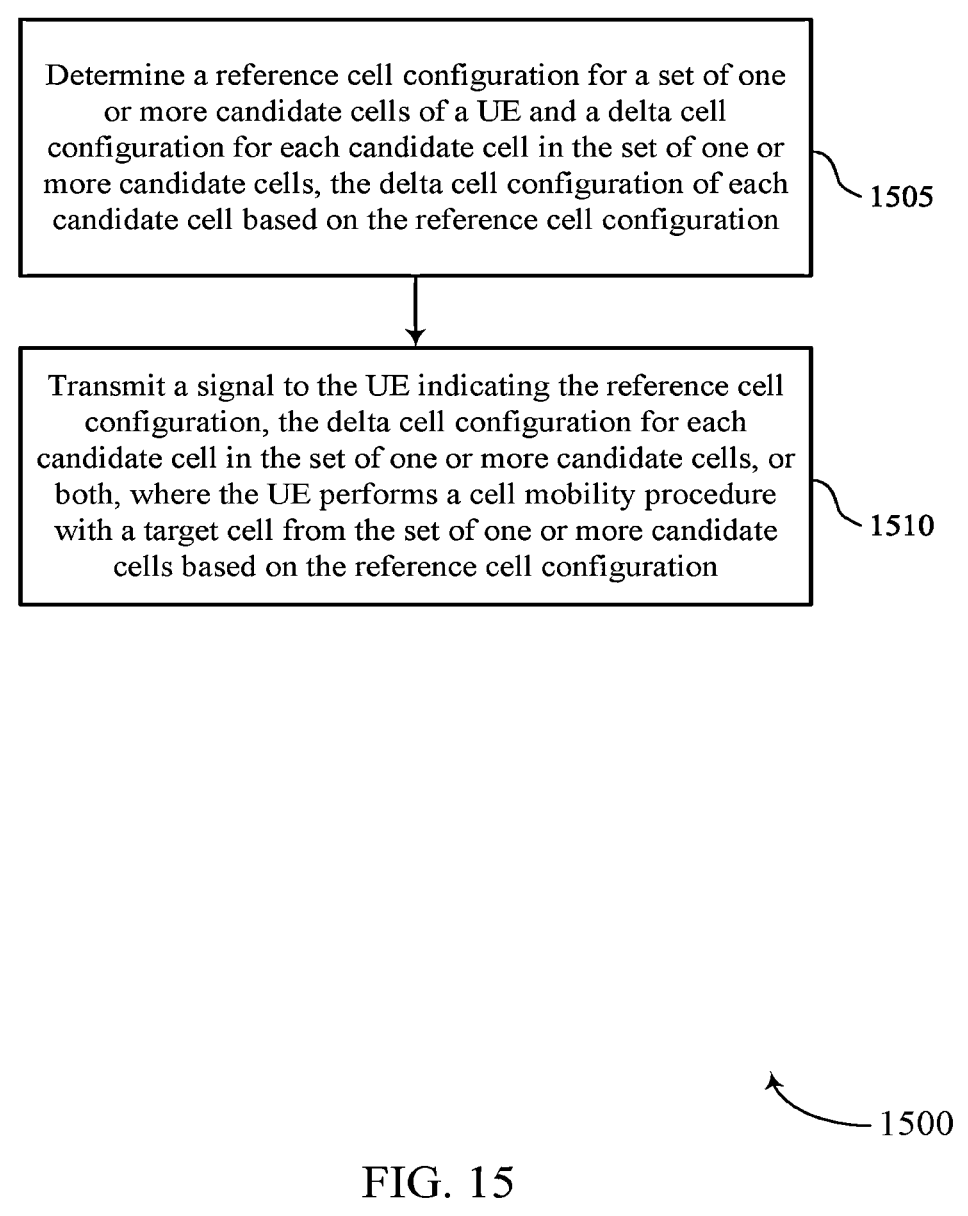

Determine a reference cell configuration for a set of one or more candidate cells of a UE and a delta cell configuration for each candidate cell in the set of one or more candidate cells, the delta cell configuration of each candidate cell based on the reference cell configuration

1505

Transmit a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration

Figure 16:
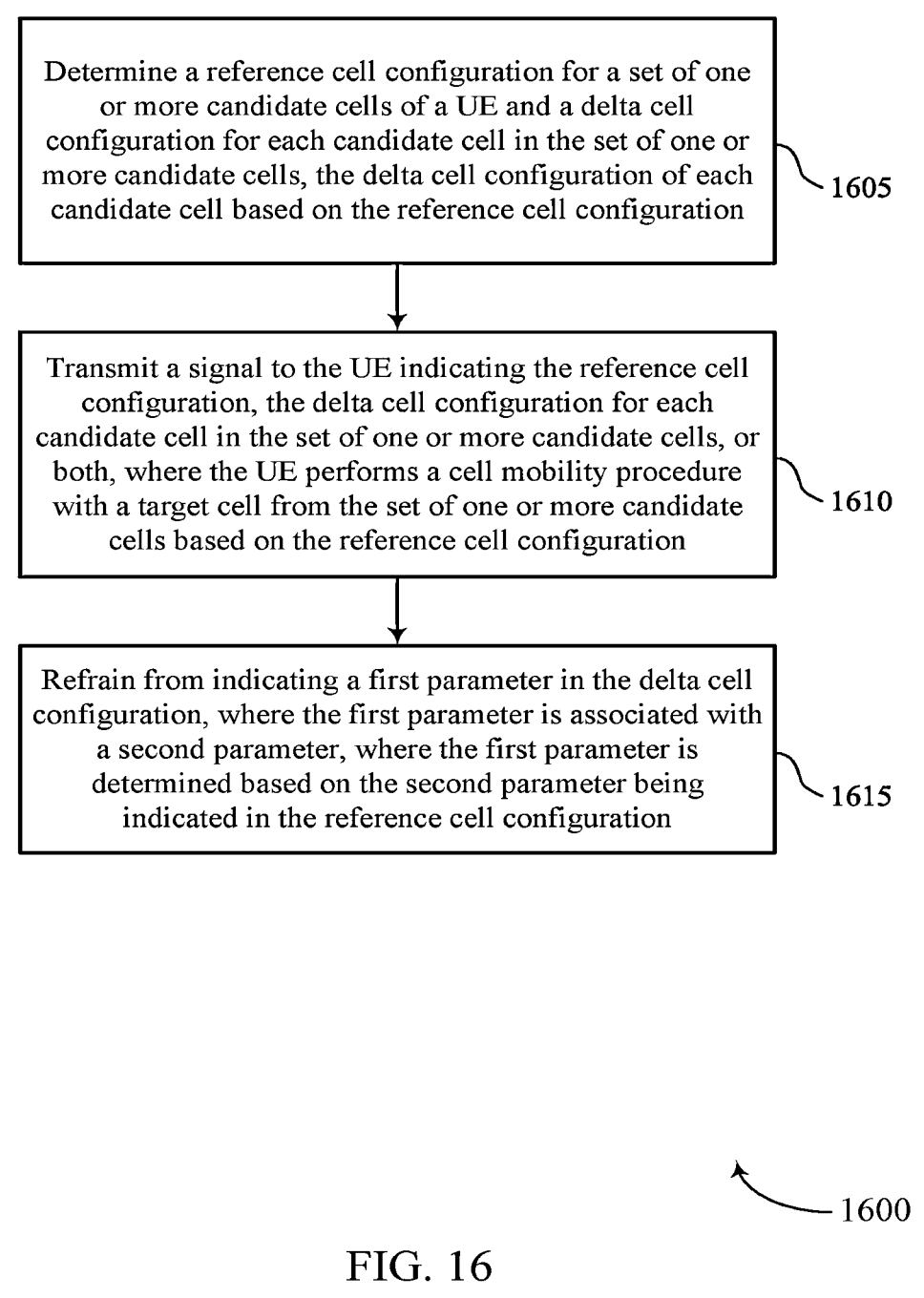

Determine a reference cell configuration for a set of one or more candidate cells of a UE and a delta cell configuration for each candidate cell in the set of one or more candidate cells, the delta cell configuration of each candidate cell based on the reference cell configuration

1605

Transmit a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration

1610

Refrain from indicating a first parameter in the delta cell configuration, where the first parameter is associated with a second parameter, where the first parameter is determined based on the second parameter being indicated in the reference cell configuration

REFERENCE CELL CONFIGURATION

FIELD OF TECHNOLOGY

The following relates to wireless communications, including reference cell configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reference cell configuration. For example, the described techniques provide for a user equipment (UE) and network to reduce configuration signaling overhead when configuring candidate cell(s) for the UE. For example, the network may identify, determine, or otherwise select a set of candidate cells for a UE (e.g., one or more candidate cells that may become a target cell during cell mobility). However, rather than configure the cell configuration of each candidate cell in the set, the network may transmit or otherwise convey an indication of a reference cell configuration for the set of candidate cells. The reference cell configuration may serve or act as a reference cell configuration relative to the actual cell configuration for each candidate cell in the set. The reference cell configuration may be the cell configuration of at least one candidate cell in the set, based on the current serving cell of the UE, and/or may be based on a hypothetical cell (e.g., not be for any real cell). The network may also signal to the UE a delta cell configuration for cell(s) in the set of candidate cells. The delta cell configuration may identify some or all of the parameters of the individual candidate cell as differential values relative to the corresponding parameters or values in the reference cell configuration, thus reducing the amount of information being signaled for each candidate cell when configuring the UE for cell mobility. Accordingly, the UE may monitor for transmissions from the candidate cells to identify or otherwise select a target cell for a handover procedure from the set of candidate cells. The UE may use the reference cell configuration alone or in combination with the delta cell configuration during the handover procedure with the target cell.

BRIEF DESCRIPTION OF THE DRAWINGS

FIGS. 12 through 16 illustrate flowcharts showing methods that support reference cell configuration in accordance with one or more aspects of the present disclosure.

DETAILED DESCRIPTION

Figure 1:
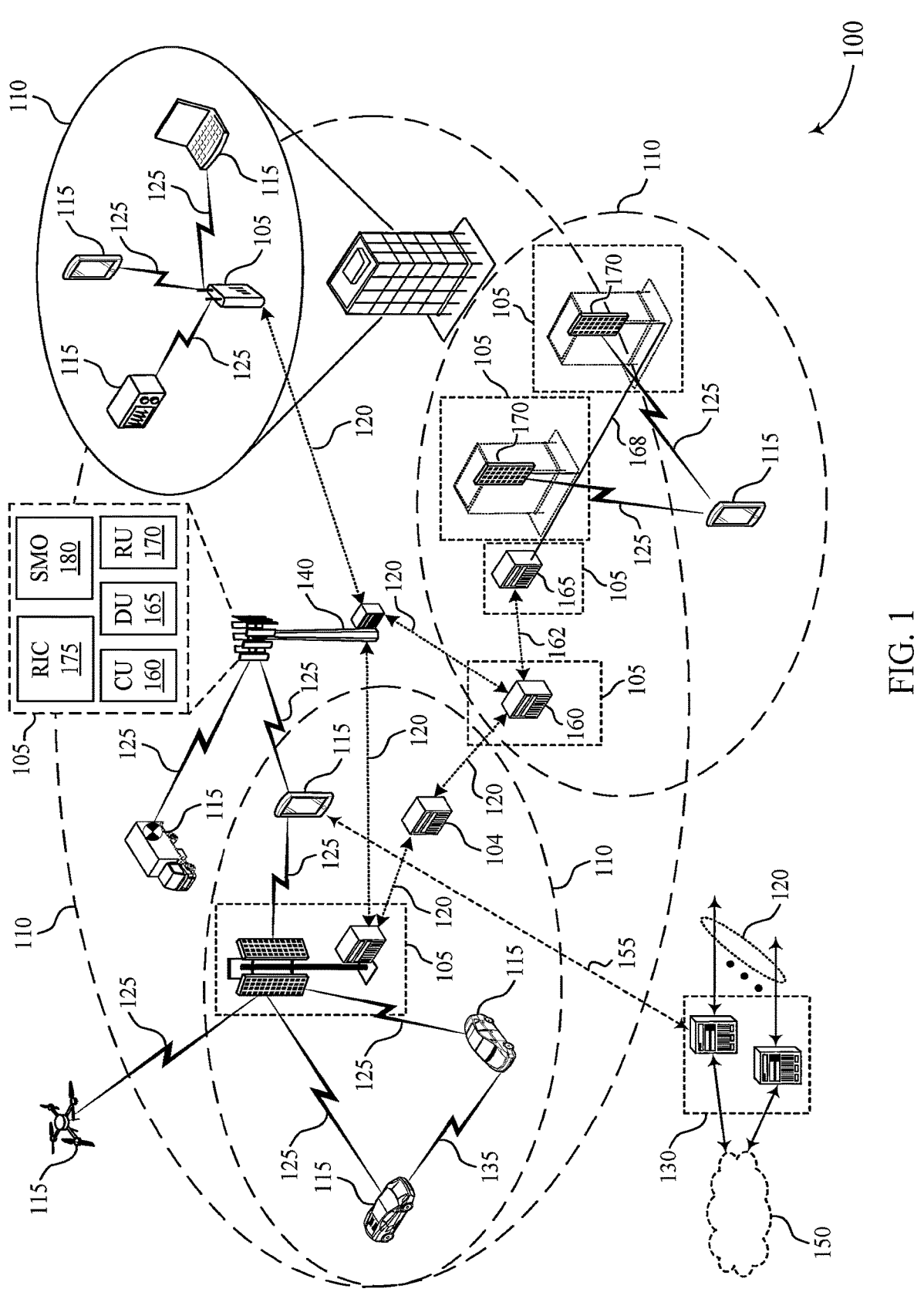
FIG. 1 illustrates an example of a wireless communications system that supports reference cell configuration in accordance with one or more aspects of the present disclosure.

Wireless networks may configure a user equipment (UE) with a set of candidate cells. Each candidate cell may refer a cell that the UE is to monitor to determine whether a handover procedure is necessary. Multiple sets of candidate cells may be configured for the UE, with each set including one or more candidate cells. Accordingly, the UE may monitor for signals from the candidate cells in each set of candidate cells to identify or otherwise determine a target cell. The target cell is generally the candidate cell from the set(s) of candidate cell(s) that the UE is to establish a wireless connection with, where the target cell becomes the new serving cell of the UE (e.g., either a new primary cell (PCell) or a new secondary cell (SCell) for the UE). However, such techniques are inefficient and signaling intensive because the network generally configures each candidate cell for the UE. That is, the network generally transmits a cell configuration identifying each parameter or value of the cell for each candidate cell in the set. The cell configuration for each candidate cell in the set may include or otherwise define such parameters or values relating to beam filtering, timing, power control, associated resources, and others, for the candidate cell. Such configuration techniques rely on extensive signaling exchanges between the UE and network used to convey each cell configuration.

Accordingly, aspects of the described techniques relate to improved methods, systems, devices, and apparatuses that support reference cell configuration. For example, the described techniques provide for a UE and network to reduce configuration signaling overhead when configuring candidate cell(s) for the UE. For example, the network may identify, determine, or otherwise select a set of candidate cells for a UE (e.g., one or more candidate cells that may become a target cell during cell mobility). However, rather than configure the cell configuration of each candidate cell in the set, the network may transmit or otherwise convey an indication of a reference cell configuration for the set of candidate cells. The reference cell configuration may serve or act as a reference cell configuration relative to the actual cell configuration for each candidate cell in the set. The reference cell configuration may be the cell configuration of at least one candidate cell in the set, based on the current serving cell of the UE, and/or may be based on a hypothetical cell (e.g., not be for any real cell). The network may also signal to the UE a delta cell configuration for cell(s) in the set of candidate cells. The delta cell configuration may identify some or all of the parameters of the individual candidate cell as differential values relative to the corresponding parameters or values in the reference cell configuration, thus reducing the amount of information being signaled for each candidate cell when configuring the UE for cell mobility. Accordingly, the UE may monitor for transmissions from the candidate cells to identify or otherwise select a target cell for a handover procedure from the set of candidate cells. The UE may use the reference cell configuration alone or in combination with the delta cell configuration during the handover procedure with the target cell.

The reference cell configuration may support reduced latency during cell mobility procedures between the UE and candidate cells that have been identified as target cells for the UE. The reference cell configuration may support significantly reduced signaling overhead generally associated with signaling the full cell configuration of each candidate cell of the UE. The UE applying the reference cell configuration and delta cell configuration, when configured, may support layer one (L1)/layer two (L2) cell mobility procedures between the UE and candidate cells, such as L1 beam reporting and management techniques.

Aspects of the disclosure are initially described in the context of wireless communications systems. Aspects of the disclosure are further illustrated by and described with reference to apparatus diagrams, system diagrams, and flowcharts that relate to reference cell configuration.

FIG. 1 illustrates an example of a wireless communications system 100 that supports reference cell configuration in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (MC) 175 (e.g., a Near-Real Time MC (Near-RT RIC), a Non-Real Time MC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as a parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reference cell configuration as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A UE 115 may receive a signal indicating a delta cell configuration for each candidate cell in a set of one or more candidate cells, the set of one or more candidate cells associated with a reference cell configuration. The UE 115 may monitor for transmissions from candidate cells in the set of one or more candidate cells to identify a target cell, the target cell comprising a candidate cell from the set of one or more candidate cells. The UE 115 may perform a cell mobility procedure with the target cell using the delta cell configuration of the candidate cell and the reference cell configuration of the set of one or more candidate cells.

A network entity 105 may determine a reference cell configuration for a set of one or more candidate cells of a UE 115 and a delta cell configuration for each candidate cell in the set of one or more candidate cells, the delta cell configuration of each candidate cell based at least in part on the reference cell configuration. The network entity 105 may transmit a signal to the UE 115 indicating the reference cell configuration, the delta cell configuration for each candidate cell in the set of one or more candidate cells, or both, wherein the UE 115 performs a cell mobility procedure with a target cell from the set of one or more candidate cells based at least in part on the reference cell configuration.

Figure 2:
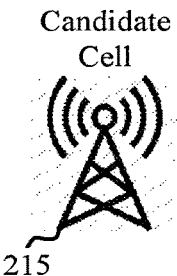
FIG. 2 illustrates an example of a wireless communications system that supports reference cell configuration in accordance with one or more aspects of the present disclosure.
Figure 2:
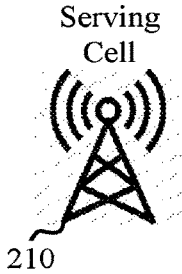
Figure 2:
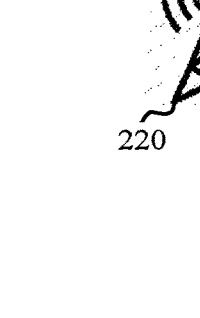
Figure 2:
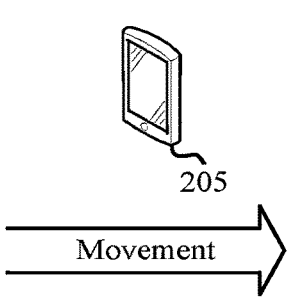
Figure 2:
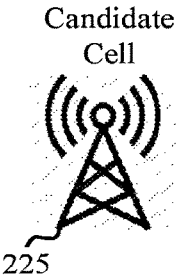
Figure 2:

FIG. 2 illustrates an example of a wireless communications system 200 that supports reference cell configuration in accordance with one or more aspects of the present disclosure. Wireless communications system 200 may implement aspects of wireless communications system 100. Wireless communications system 200 may include a UE 205, a serving cell 210, a candidate cell 215, a candidate cell 220, and/or a candidate cell 225, which may be examples of the corresponding devices described herein. Generally, the serving cell 210 may be a current serving cell of the UE 205, with the UE 205 configured with a set of one or more candidate cells for cell mobility. In the non-limiting example illustrated in FIG. 2, the set of one or more candidate cells may include the candidate cell 215, the candidate cell 220, and the candidate cell 225, although the set of candidate cells may include more or less than three candidate cells.

Wireless communications system 200 may support cell mobility for the UE 205. For example, the UE 205 may monitor for transmissions (e.g., reference signal transmissions, synchronization signal transmissions, or any other transmissions) from a candidate cell (e.g., network device) to determine whether a connection can or should be established with the candidate cell. For example, monitoring for such transmissions may enable the UE 205 to determine whether the characteristics of a wireless channel (e.g., channel quality information (CQI)) between the UE 205 and the candidate cell would support wireless communications. Based on such monitoring, the UE 205 and/or network may perform various cell mobility procedures, such as a handover procedure replacing the current serving cell of the UE 205 with a new serving cell (such as when the channel performance with the current serving cell is becoming or has become unusable) and/or to identify a new SCell to be added for the UE 205 (e.g., during carrier aggregation (CA)). Wireless communications system 200 generally illustrates a non-limiting example of a cell mobility procedure where the UE 205 is to perform a handover procedure from its current serving cell (e.g., the serving cell 210) to a new serving cell (e.g., a target cell selected from the set of candidate cells, which is candidate cell 220 in this example) due to UE movement, for example. However, it is to be understood that the techniques described herein are not limited to the handover cell mobility procedure.

Wireless communications system 200 generally supports such cell mobility procedures for the UE 205, such as L1/L2 based cell mobility. For example, the techniques described herein may include mechanisms and procedures of L1/L2 based inter-cell mobility that reduces mobility latency. The techniques described herein may include configuration and maintenance for multiple candidate cells to be configured to support fast application of cell configurations of the candidate cells. The techniques described herein may include dynamic switching mechanisms from among candidate cells (including special cell (SpCell) and SCell) for various scenarios based on L1/L2 signaling. The techniques described herein may include L1 enhancements for inter-cell beam management, including L1 measurement and reporting, beam indications, and other beam management use cases. The techniques described herein may include management of timing advance (TA) among the candidate cells, central unit-distributed unit (CU-DU) signaling to support L1/L2 mobility, and other features relating to such cell mobility.

Cell mobility procedures (e.g., L1/L2 based mobility) may be applied during various scenarios. One example may include an individual cell selection scenario where separate signaling is used for PCell change and SCell change in the case of CA, respectively. In this scenario, beam indication based on PCell selection may be used, with SCell selection being based on L1/L2 signaling (e.g., downlink control information (DCI) or medium access control-control element (MAC-CE) signaling). One example of this scenario may include a preconfigured candidate PCell set (e.g., the cells in the set may be candidate PCells) where a single PCell is selected from a (pre)configured candidate PCell set. The PCell may or may not be configured with CA or dual-connectivity (DC). The candidate cell 215, the candidate cell 220, and the candidate cell 225 would be included, in this example, in a set of candidate PCells for the UE 205. Another example of this scenario is where the PCell change is based on an SCell of the UE 205. That is, the candidate cell 220 may be an SCell of the UE 205. However, the UE 205 may perform a cell mobility procedure to establish the candidate cell 220 as a new PCell of the UE 205 (e.g., the candidate cell 220 would switch from an SCell to a PCell of the UE 205).

Another scenario may include a cell group based selection (e.g., SpCell and SCell may be switched together, such as in the case of CA). The cell group switch signaling may be based on an extension of signaling used for single cell mobility. In this scenario, the candidate cell 215, the candidate cell 220, and the candidate cell 225 may be configured as part of the same candidate cell group or as candidate cells within different candidate cell groups.

However, as discussed above conventional techniques generally include the network (e.g., via the serving cell 210, which is the current serving cell/PCell of the UE 205) exchanging various signaling with the UE 205 to configure each candidate cell for the UE 205. For example, each candidate cell may generally be associated with a cell configuration that identifies various parameters, resources, values, and other information that the UE 205 will use to monitor the candidate cell and, if the candidate cell is a suitable target cell, use to establish a connection with the candidate cell (e.g., perform a cell mobility procedure with). Examples of such information may include TA, beam configuration information, power control information, and other information used by the UE 205 to monitor and/or perform cell mobility with a given candidate cell. Moreover, such signaling overhead may be even further enhanced since candidate cells may include serving cell(s) (e.g., PCell(s)/SCell)(s)), deactivated cell(s), as well as candidate non-serving cell(s) of the UE 205. Such signaling overhead results in inefficient utilization of resources as well as delays cell mobility for the UE 205, which may lead to disrupted communications.

Accordingly, aspects of the techniques described herein provide various mechanisms for the network to efficiently configure the UE 205 with candidate cell configurations for cell mobility, such as L1/L2 cell mobility. Aspects of the techniques described herein leverage similarities between different cells to reduce the information being provided to the UE 205 when configuring each candidate cell in the set of candidate cells. For example, candidate cells operating in the same frequency band (e.g., frequency range one (FR1), frequency range two (FR2), or some other frequency band) may have the same or similar beam filter configurations. As another example, candidate cells located near each other (e.g., within a threshold distance from each other and/or relative to the location of the UE 205) may have the same or a similar timing advance configuration.

Aspects of the techniques described herein may include a delta cell configuration and a reference cell configuration being used during cell mobility. This may include using a cell configuration of one cell (e.g., a real cell, such as the PCell/Scell of the UE 205 or one of the candidate cells in the set, or hypothetical cell) as a reference cell configuration. The network (e.g., via the serving cell 210) may transmit or otherwise provide an indication of the reference cell configuration to the UE 205 via RRC signaling (e.g., when configuring a set of candidate cells consisting of at least one candidate cell) or dynamically using MAC-CE signaling or DCI signaling (e.g., when activating, deactivating, or otherwise configuring a candidate cell and/or the set of candidate cells). The reference cell configuration may define, indicate, or otherwise identify value(s), field(s), or parameters associated with a conventional cell configuration, such as TA information, beam configuration information, and so forth. The reference cell configuration may be for the set of candidate cells (e.g., may be associated with a candidate cell group identifier (ID) or index, where each candidate cell in the set is associated with the same cell group ID). The reference cell configuration (which may have or otherwise be associated with the candidate cell group ID) may be configured when configuring the UE 205 with the set of candidate cells or configured separately (e.g., candidate cells may be added or dropped from the set). For example, the network may configure or otherwise indicate the candidate cell group ID to the UE 205 and when configuring or adding new candidate cells, may include a candidate cell group ID for the candidate cell upon activation or deactivation, and in response to other considerations. Based on the candidate cell group ID being configured for the candidate cell, the UE 205 may determine that the candidate cell is included in the set of candidate cells associated with the reference cell configuration. The UE 205 may be configured with multiple reference cell configurations in some examples, with each reference cell configuration being associated with a different set of candidate cells.

The techniques described herein further provide for the network to transmit or otherwise provide an indication of a delta cell configuration for each candidate cell (e.g., for one, some, or all of the candidate cells) in the set of candidate cells. The delta cell configuration generally defines or otherwise indicates the cell configuration value(s), field(s) or parameter(s) for the candidate cell relative to the reference cell configuration. This may include differential values being included in the delta cell configuration, with the differential values being signaled relative to the reference cell configuration. For example, if the TA value in the reference cell configuration is 200 ns, and the TA of a candidate cell is 209 ns, then the TA indicated in the delta cell configuration would be 9 ns.

In some examples, bit(s) or other explicit or implicit indications may be included or otherwise provided to indicate whether the field(s), value(s) or parameter(s) indicated in the delta cell configuration are differential values (e.g., relative to the reference cell configuration) or absolute values (e.g., the traditional cell configuration information for the candidate cell). Accordingly, the UE 205 may identify or otherwise determine, based on the bit(s) indicated in the delta cell configuration, that the field(s), value(s), or parameter(s) are indicated as differential values relative to the reference cell configuration, or as absolute values for the candidate cell.

In some examples, different field(s), value(s), or parameter(s) within the delta cell configuration may follow different options regarding signaling. For example, some field(s) (a first subset of fields) may indicate differential values while other field(s) (a second subset of fields) may indicate absolute values while other field(s) (a third subset of fields) may not be indicated in the delta cell configuration (and thus the UE 205 may rely on the corresponding field(s) in the reference cell configuration).

In some examples, the delta cell configuration may include an indication of each field, value, or parameter for the candidate cell relative to the reference cell configuration (e.g., all of the field(s) and such are indicated). In some examples, the delta cell configuration may include an indication of some of the field(s), value(s), or parameter(s) relative to the reference cell configuration, such as only the information that is different from the corresponding field(s), value(s), or parameter(s) in the reference cell configuration or only the information that is a threshold difference from the corresponding field(s), value(s), or parameter(s) in the reference cell configuration. Accordingly, when the UE 205 identifies or otherwise determines that the delta cell configuration of a candidate cell is configured and includes the differential field(s), value(s), or parameter(s), relative to the reference cell configuration, the UE 205 may use both the delta cell configuration and the reference cell configuration during the cell mobility procedure with the target cell. For example, the UE 205 may use the field(s), value(s), or parameter(s) of the reference cell configuration and the corresponding field(s), value(s), or parameter(s) of the delta cell configuration (e.g., the differential values) during cell mobility.

In some examples, such as where the field(s), value(s), or parameter(s) of the cell configuration of a candidate cell in the set are the same as, or within a threshold range of, the corresponding field(s), value(s), or parameter(s) in the reference cell configuration, then the delta cell configuration for that candidate cell may not be signaled to the UE 205. In this example, the candidate cell (e.g., once identified as a target cell for the UE 205) may use the reference cell configuration (e.g., when the delta cell configuration of the candidate cell is not explicitly signaled or otherwise configured) during cell mobility. Accordingly, when the UE 205 identifies or otherwise determines that the delta configuration for a candidate cell is not configured for the UE 205, the UE 205 may use the reference cell configuration for the target cell (e.g., the candidate cell selected or otherwise identified as the target cell). For example, the UE 205 may use the transmission configuration indicator (TCI) pool, TA group list, a non-serving cell physical cell identifier (PCI) list, and the like, in the reference cell configuration when the delta cell configuration of the candidate cell is not configured.

In some examples, the reference cell configuration may be on a per-cell basis or on a per-field basis. For example, the per-cell basis may include a set of parameters of the reference cell configuration being used as the corresponding set of parameters of the delta cell configuration. That is, all of the field(s), value(s), or parameter(s) in the delta cell configuration of the candidate cell (e.g., once identified as a target cell of the UE 205), when not configured for the UE 205, may be determined during the cell mobility procedure from the corresponding field(s), value(s), or parameter(s) in the reference cell configuration.

The per-field basis may include a per-parameter reference cell configuration where one or more parameters in the delta cell configuration are indicated as differential values relative to the corresponding one or more parameters in the reference cell configuration. That is, the reference cell configuration may be configured such that different field(s), value(s), or parameter(s) may have or otherwise be associated with different reference cell group IDs (e.g., different candidate cell group IDs). In some examples, different groups of field(s), value(s), or parameter(s) in the reference cell configuration may follow the same reference cell (group of fields in RRC information element (IE)). The group of fields may be defined for the UE 205, such as based on the relationship of the functions of the parameter fields. For example, all fields related to TCI may be grouped together, all fields related to TA configuration may be grouped together, and so forth, where different groups may have different reference cells (e.g., different candidate cell group IDs).

In some situations, one or more field(s), value(s), or parameter(s) (e.g., field A) in a cell configuration may be linked, based on, or otherwise determined based on different fields, values, or parameters (e.g., field B). For example, in some networks a TCI state in a TCI pool may be linked to or otherwise associated with a tracking area group (TAG) ID. As another example, each TCI state may be linked to a PCI index identified in another field, which is a list of a different cell PCI. As yet another example, a channel state information-reference signal (CSI-RS) resource configuration may be defined based on a TCI ID in the TCI pool. Accordingly, this may create the situation where the field A is not configured in the delta cell configuration for the target cell and is therefore borrowed from the reference cell configuration. A conflict may arise when the target cell (e.g., in the delta cell configuration) and the reference cell (e.g., in the reference cell configuration) have different configurations for field B. As one example, a TCI in a reference cell configuration may be defined based on TAG ID=2, where the target cell has no TAG ID=2 configured.

To avoid this conflict, aspects of the techniques described herein provide various techniques where such linked field(s), value(s), or parameter(s) are correctly configured for the UE 205. One technique may include the network (e.g., the serving cell 210) adopting a configuration constraint where the conflict is avoided when configuring the UE 205. For example, if the serving cell 210 determines that first and second parameters are linked or otherwise associated with each other for the UE 205, and that the first parameter or the second parameter are not indicated in either the delta cell configuration or the reference cell configuration, then the serving cell 210 may refrain from including the second parameter or the first parameter in the reference cell configuration or the delta cell configuration, respectively. That is, when either parameter is not included in one cell configuration, the serving cell 210 refrains from including or indicating the other parameter in the other cell configuration.

Another technique may include the serving cell 210 always including field A and field B together, such that they are either both explicitly indicated or otherwise configured or neither are indicated or otherwise indicated in the reference cell configuration and delta cell configuration. Thus, the UE 205 may identify or otherwise determine that the first parameter (field A) is indicated in one cell configuration (e.g., either the reference cell configuration or the delta cell configuration), then the second parameter (field B) is indicated or otherwise included in the other cell configuration (e.g., either the delta cell configuration or the reference cell configuration). Similarly, in some examples where field A is not explicitly configured in one cell configuration, then field B may not be explicitly configured in the other cell configuration.

Another technique may include, when field A is not explicitly configured in the delta cell configuration for the target cell, at least for the purposes of determining field A, the UE 205 may borrow the field B definition in the reference cell configuration. That is, in this example when the UE 205 determines that the first parameter (e.g., field A) is not indicated in the delta cell configuration, the UE 205 may determine the first parameter based on the second parameter (e.g., field B) indicated in the reference cell configuration.

In some aspects, the techniques described herein may be based on UE capability reporting. For example, the UE 205 may transmit or otherwise provide a UE capability message to the serving cell 210 that carries or otherwise conveys an indication of the supported maximum number of configured reference cells and/or candidate cells (e.g., reference cell configurations and/or delta cell configurations). For example, the UE 205 may transmit a UE capability message indicating a maximum number of delta cell configurations and reference cell configurations (e.g., a single reporting of the maximum number of configured cells, including both reference and non-reference cells). In some examples, the UE capability message may indicate a first maximum number of delta cell configurations and a second maximum number of reference cell configurations (e.g., separate reporting of the maximum number of supported reference and non-reference cells). In some aspects of either UE capability reporting example, the maximum number of supported reference cell configurations (e.g., reference cells) and/or the maximum number of supported delta cell configurations (e.g., non-reference cells) may be reported on a per-frequency basis (for one supported bandwidth) or across all configured frequencies (e.g., for all supported bandwidths) of the UE 205. As discussed above, references to a candidate cell herein may include a single candidate cell or a candidate cell group (e.g., a set of one or more candidate cells), which may be assigned or otherwise associated with a candidate configuration index signaled in the cell switch command, for example.

Accordingly, the techniques described herein provide various mechanisms to conserve over-the-air resources, reduce congestion, and improve latency during cell mobility by leveraging similarities between candidate cells. Such similarities may be defined using a reference cell configuration that can either be adopted as the cell configuration of the target cell or used in conjunction with a delta cell configuration, when configured, of the target cell. The delta cell configuration of the target cell (e.g., a candidate cell from a set of one or more candidate cells) may include field(s), value(s), or parameter(s) indicated as differential values relative to the corresponding field(s), value(s), or parameter(s) indicated in the reference cell configuration.

Figure 3:
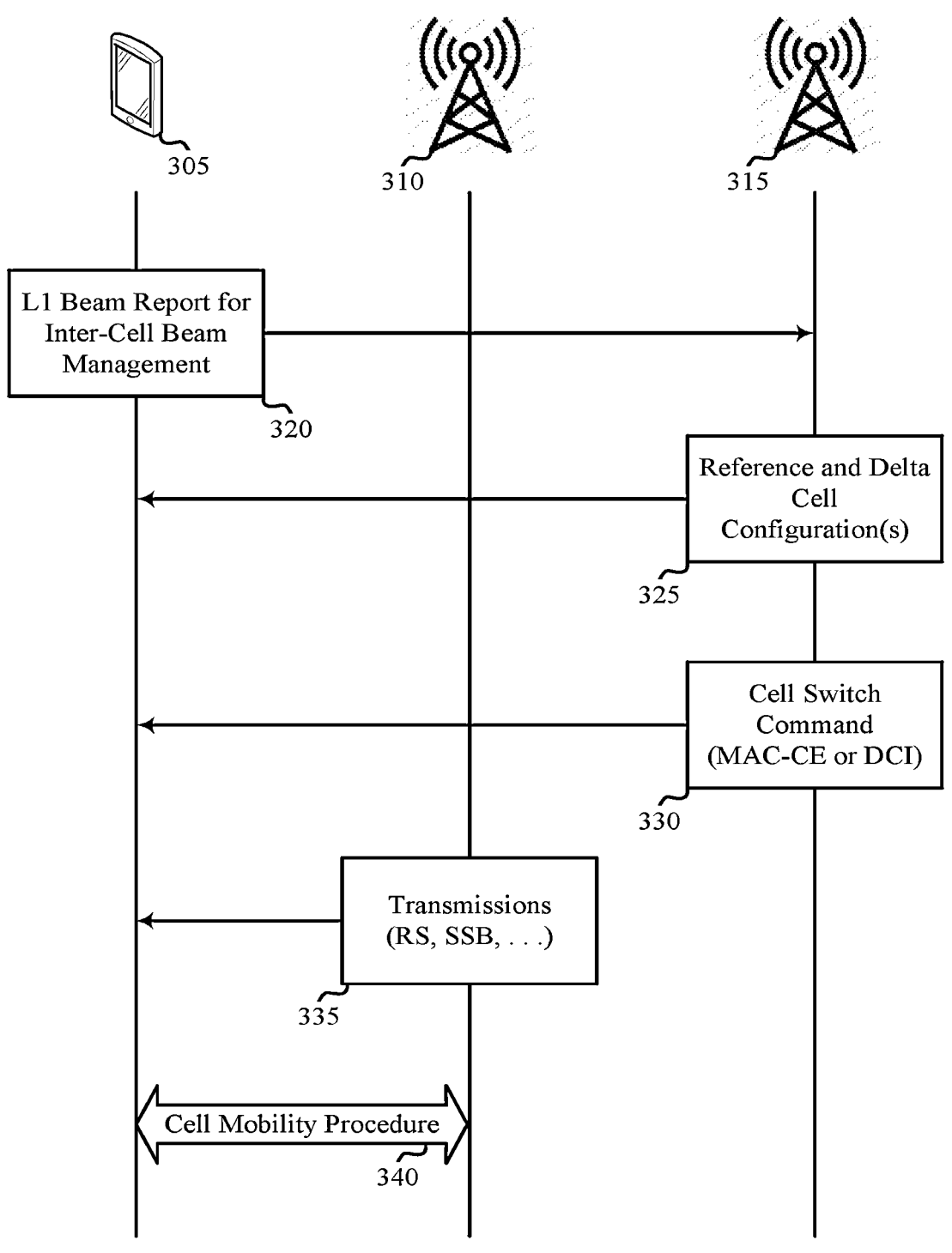
FIG. 3 illustrates an example of a process that supports reference cell configuration in accordance with one or more aspects of the present disclosure.

FIG. 3 illustrates an example of a process 300 that supports reference cell configuration in accordance with one or more aspects of the present disclosure. Process 300 may implement aspects of wireless communications systems 100 and/or 200. Aspects of process 300 may be implemented at or implemented by a UE 305, a target cell 310, and/or a serving cell 315, which may be examples of the corresponding devices described herein. For example, the target cell 310 and/or the serving cell 315 may be examples of a network device, as described herein. Process 300 illustrates a non-limiting example of techniques for the network (e.g., via the serving cell 315) to signal or otherwise indicate a reference cell ID (e.g., the ID of a reference cell configuration) to the UE 305.

At 320, the UE 305 may transmit or otherwise provide a channel performance feedback message. The feedback message may carry or otherwise convey an indication of a L1 beam report for inter-cell beam management. That is, the channel performance feedback message may indicate a result of the UE 305 monitoring for and detecting (e.g., measuring) transmissions from one or more candidate cells (e.g., the target cell 310) to identify otherwise determine a target cell. The L1 beam report may indicate, in this example, that the target cell 310 is a target cell of the UE 305 (e.g., either explicitly indicate a measurement result) or indicate that the target cell is a suitable candidate for cell mobility.

At 325, the serving cell 315 may transmit or otherwise provide a signal (one or more RRC signals) to the UE 305 that indicates a reference cell configuration for a set of one or more candidate cells and one or more delta cell configuration for candidate cells in the set. In some aspects, the signal may be transmitted to the UE 305 prior to the L1 beam report transmitted from the UE 305, or after as is shown in process 300. In some examples, the reference cell configuration may be indicated using a candidate cell group ID (e.g., reference cell ID) that identifies the reference cell configuration. The delta cell configuration for some or all of the candidate cells in the set may include differential values (e.g., TA=9 ns) relative to the corresponding values (e.g., TA=200 ns) in the reference cell configuration. The UE 305 may use the differential value in the delta cell configuration of the candidate cell and the corresponding value in the reference cell configuration to determine a TA of the candidate cell (e.g., TA=209 ns), which has been identified as a target cell of the UE 305. When the delta cell configuration for the target cell is not configured for the UE 305, then the UE 305 may use the reference cell configuration of the set of candidate cells to determine that the TA=200 ns for the candidate cell.

At 330, the serving cell 315 may transmit or otherwise provide a cell switch command (e.g., a trigger signal) to the UE 305 that initiates a cell mobility procedure between the UE 305 and the target cell 310. For example, the cell switch command may be based at least in part on the L1 beam report provided by the UE 305. This may include the L1 beam reporting indicating that the target cell 310 may be a suitable PCell, SCell, SpCell, and the like, for the UE 305.

At 335, the UE 305 may optionally monitor for one or more transmission from the target cell 310. The UE 305 may monitor for the transmissions in response to the cell switch command. That is, the UE 305 may begin to monitor for transmission from the target cell 310 based on the cell switch command indicating that the target cell 310 is a suitable target cell for the UE 305, and therefore directs the UE 305 to perform the cell mobility procedure with the target cell 310 to establish a wireless connection. This feature may be optional in that the UE 305 may have previously monitored for transmissions from the target cell 310 and the L1 beam report previously transmitted may be based on that previous monitoring. In some examples, the UE 305 may have previously monitored for transmissions and reported measurement results of those transmissions and again monitor for transmissions from the target cell 310 in response to the cell switch command. In some examples, the reference cell configuration (e.g., the candidate cell group ID) may be indicated to the UE 305 in the cell switch command (e.g., rather than previously (pre)configured for the UE 305).

At 340, the UE 305 and the target cell 310 may perform a cell mobility procedure. For example, the cell mobility procedure may include the target cell 310 replacing a serving cell for the UE 305 (e.g., become a new PCell of the UE 305), adding the target cell 310 as a new SCell or SpCell of the UE 305, and the like.

Accordingly, process 300 illustrates a non-limiting example where the reference cell ID (e.g., the candidate cell group ID of the reference cell configuration) is assigned using a reference cell configuration index (e.g., the candidate cell group ID). The reference cell ID may be signaled in the cell switch command or may be (pre)configured before the cell switch command.

Figure 4:
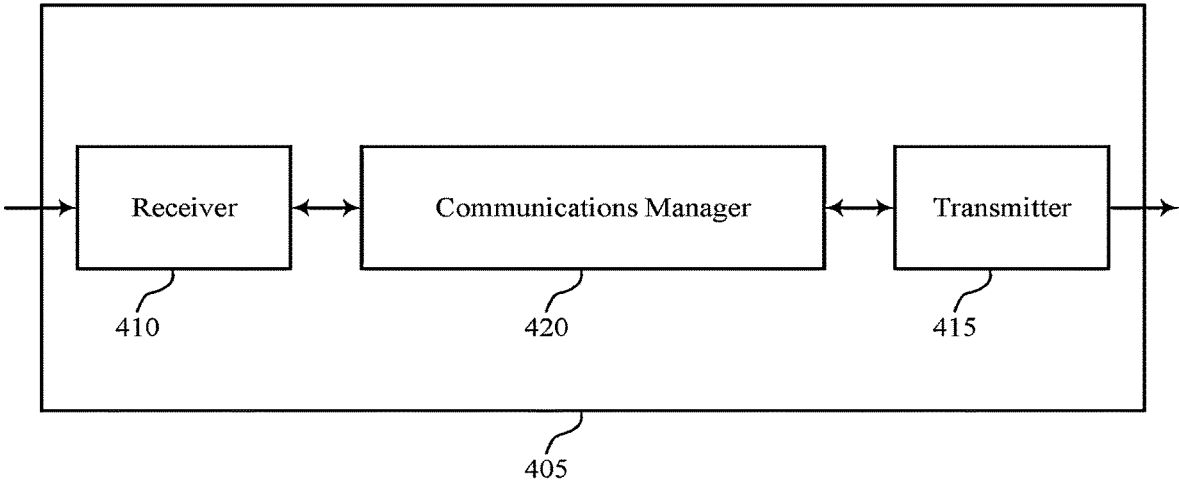
FIGS. 4 and 5 illustrate block diagrams of devices that support reference cell configuration in accordance with one or more aspects of the present disclosure.

FIG. 4 illustrates a block diagram 400 of a device 405 that supports reference cell configuration in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to reference cell configuration). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to reference cell configuration). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of reference cell configuration as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for receiving a signal indicating a delta cell configuration for each candidate cell in a set of one or more candidate cells, the set of one or more candidate cells associated with a reference cell configuration. The communications manager 420 may be configured as or otherwise support a means for monitoring for transmissions from candidate cells in the set of one or more candidate cells to identify a target cell, the target cell including a candidate cell from the set of one or more candidate cells. The communications manager 420 may be configured as or otherwise support a means for performing a cell mobility procedure with the target cell using the delta cell configuration of the candidate cell and the reference cell configuration of the set of one or more candidate cells.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for more efficient cell configuration signaling that reduces latency by leveraging similarities between candidate cells in a set of candidate cells. This may include configuring a UE with a reference cell configuration for the set of candidate cells and delta cell configurations for some or all of the candidate cells in the set.

Figure 5:
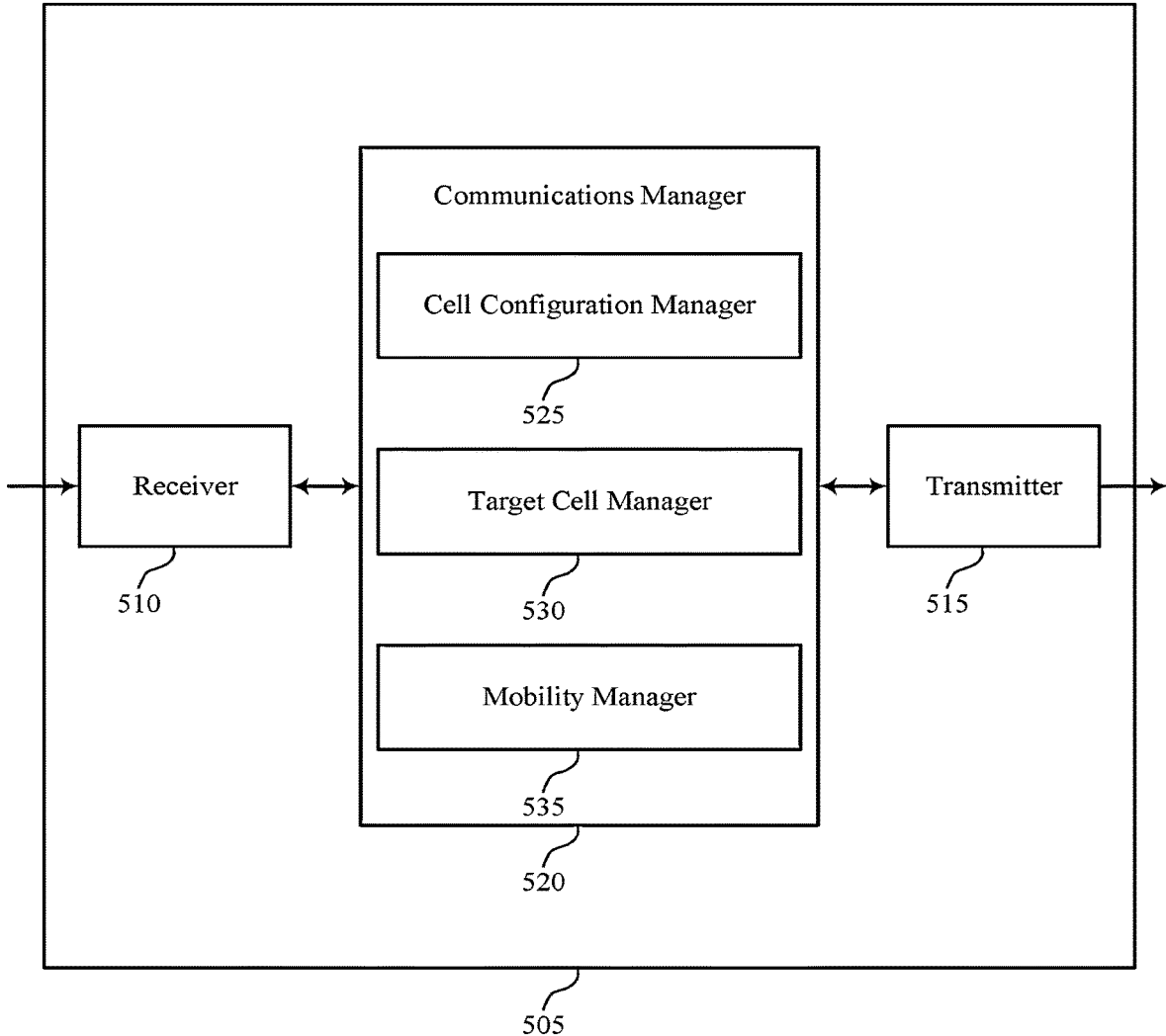

FIG. 5 illustrates a block diagram 500 of a device 505 that supports reference cell configuration in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reference cell configuration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reference cell configuration). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of reference cell configuration as described herein. For example, the communications manager 520 may include a cell configuration manager 525, a target cell manager 530, a mobility manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The cell configuration manager 525 may be configured as or otherwise support a means for receiving a signal indicating a delta cell configuration for each candidate cell in a set of one or more candidate cells, the set of one or more candidate cells associated with a reference cell configuration. The target cell manager 530 may be configured as or otherwise support a means for monitoring for transmissions from candidate cells in the set of one or more candidate cells to identify a target cell, the target cell including a candidate cell from the set of one or more candidate cells. The mobility manager 535 may be configured as or otherwise support a means for performing a cell mobility procedure with the target cell using the delta cell configuration of the candidate cell and the reference cell configuration of the set of one or more candidate cells.

Figure 6:
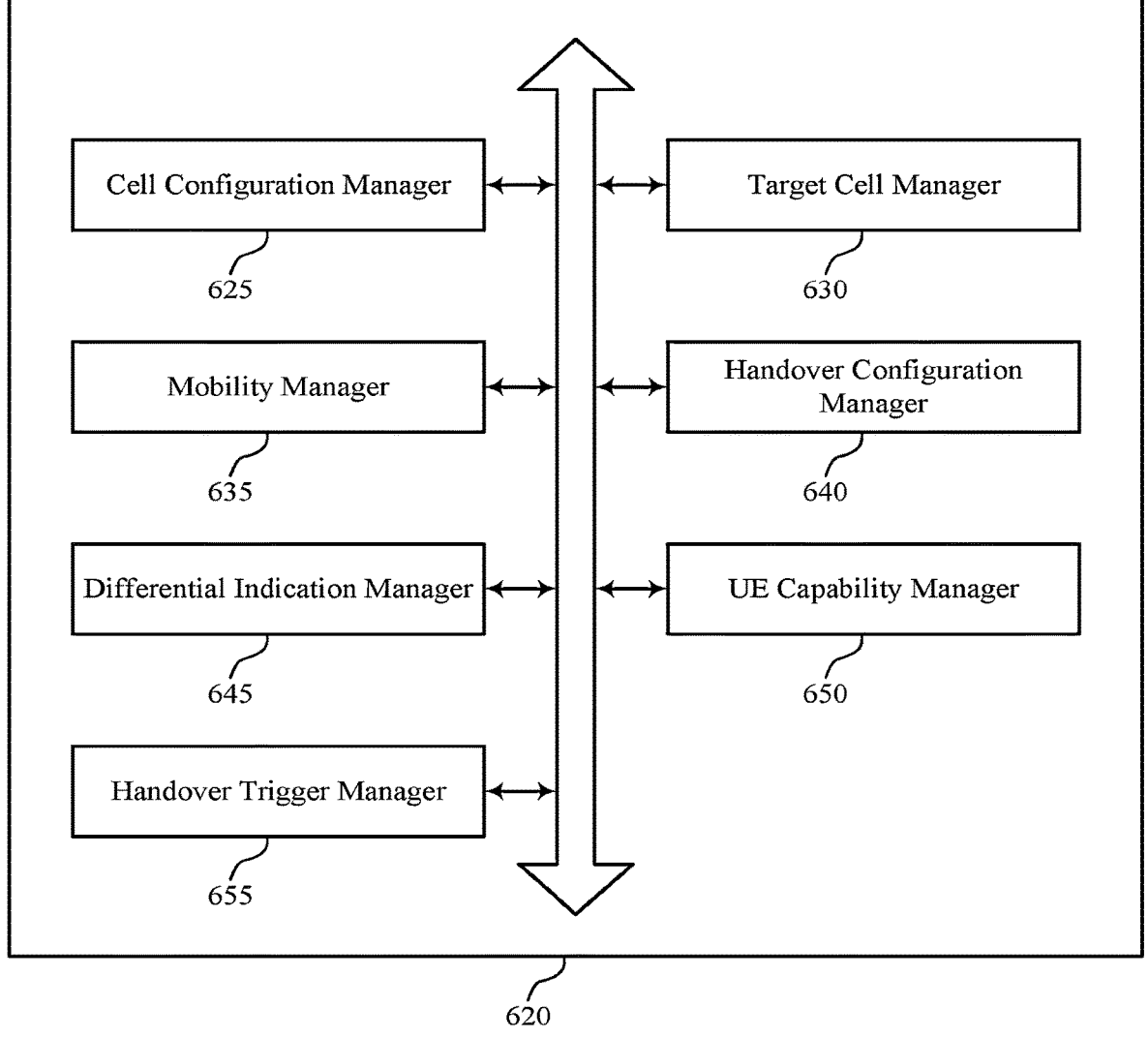
FIG. 6 illustrates a block diagram of a communications manager that supports reference cell configuration in accordance with one or more aspects of the present disclosure.

FIG. 6 illustrates a block diagram 600 of a communications manager 620 that supports reference cell configuration in accordance with one or more aspects of the present disclosure. The communications manager 620 may be an example of aspects of a communications manager 420, a communications manager 520, or both, as described herein. The communications manager 620, or various components thereof, may be an example of means for performing various aspects of reference cell configuration as described herein. For example, the communications manager 620 may include a cell configuration manager 625, a target cell manager 630, a mobility manager 635, a handover configuration manager 640, a differential indication manager 645, a UE capability manager 650, a handover trigger manager 655, or any combination thereof. Each of these components may communicate, directly or indirectly, with one another (e.g., via one or more buses).

The communications manager 620 may support wireless communication at a UE in accordance with examples as disclosed herein. The cell configuration manager 625 may be configured as or otherwise support a means for receiving a signal indicating a delta cell configuration for each candidate cell in a set of one or more candidate cells, the set of one or more candidate cells associated with a reference cell configuration. The target cell manager 630 may be configured as or otherwise support a means for monitoring for transmissions from candidate cells in the set of one or more candidate cells to identify a target cell, the target cell including a candidate cell from the set of one or more candidate cells. The mobility manager 635 may be configured as or otherwise support a means for performing a cell mobility procedure with the target cell using the delta cell configuration of the candidate cell and the reference cell configuration of the set of one or more candidate cells.

In some examples, the handover configuration manager 640 may be configured as or otherwise support a means for determining that the delta cell configuration of the candidate cell is not configured for the UE, where performing the cell mobility procedure with target cell includes using the reference cell configuration for the target cell.

In some examples, the handover configuration manager 640 may be configured as or otherwise support a means for determining that the delta cell configuration of the candidate cell includes one or more differential parameters relative to a corresponding one or more reference parameters of the reference cell configuration, where performing the cell mobility procedure with the target cell includes using the one or more differential parameters of the delta cell configuration and the corresponding one or more reference parameters of the reference cell configuration for the target cell.

In some examples, the reference cell configuration includes a per-cell reference cell configuration where a set of parameters of the reference cell configuration are used as a corresponding set of parameters of the delta cell configuration or a per-parameter reference cell configuration where one or more parameters of the delta cell configuration are indicated as differential values relative to a corresponding one or more parameters of the reference cell configuration.

In some examples, the handover configuration manager 640 may be configured as or otherwise support a means for determining, based on a bit indicated in the delta cell configuration, that the one or more parameters of the delta cell configuration are indicated as differential values relative to a corresponding one or more parameters of the reference cell configuration.

In some examples, the differential indication manager 645 may be configured as or otherwise support a means for determining that a first parameter is indicated in the reference cell configuration, the delta cell configuration, or both, where the first parameter is associated with a second parameter. In some examples, the differential indication manager 645 may be configured as or otherwise support a means for determining that the second parameter is indicated in the reference cell configuration, the delta cell configuration, or both, based on the first parameter being indicated.

In some examples, the differential indication manager 645 may be configured as or otherwise support a means for determining that a first parameter is not indicated in the delta cell configuration, where the first parameter is associated with a second parameter. In some examples, the differential indication manager 645 may be configured as or otherwise support a means for determining, based on the first parameter not being indicated, the first parameter based on the second parameter indicated in the reference cell configuration.

In some examples, the UE capability manager 650 may be configured as or otherwise support a means for transmitting a UE capability message indicating a supported maximum number of delta cell configurations and reference cell configurations on a per-bandwidth basis, for all supported bandwidths, or both.

In some examples, the UE capability manager 650 may be configured as or otherwise support a means for transmitting a UE capability message indicating a first supported maximum number of delta cell configurations and a second supported maximum number of reference cell configurations on a per-bandwidth basis, for all supported bandwidths, or both.

In some examples, the handover trigger manager 655 may be configured as or otherwise support a means for receiving a trigger signal initiating the cell mobility procedure with the target cell, where the cell mobility procedure is performed based on the trigger signal.

In some examples, the trigger signal identifies the reference cell configuration from a set of available reference cell configurations to be used during the cell mobility procedure.

Figure 7:
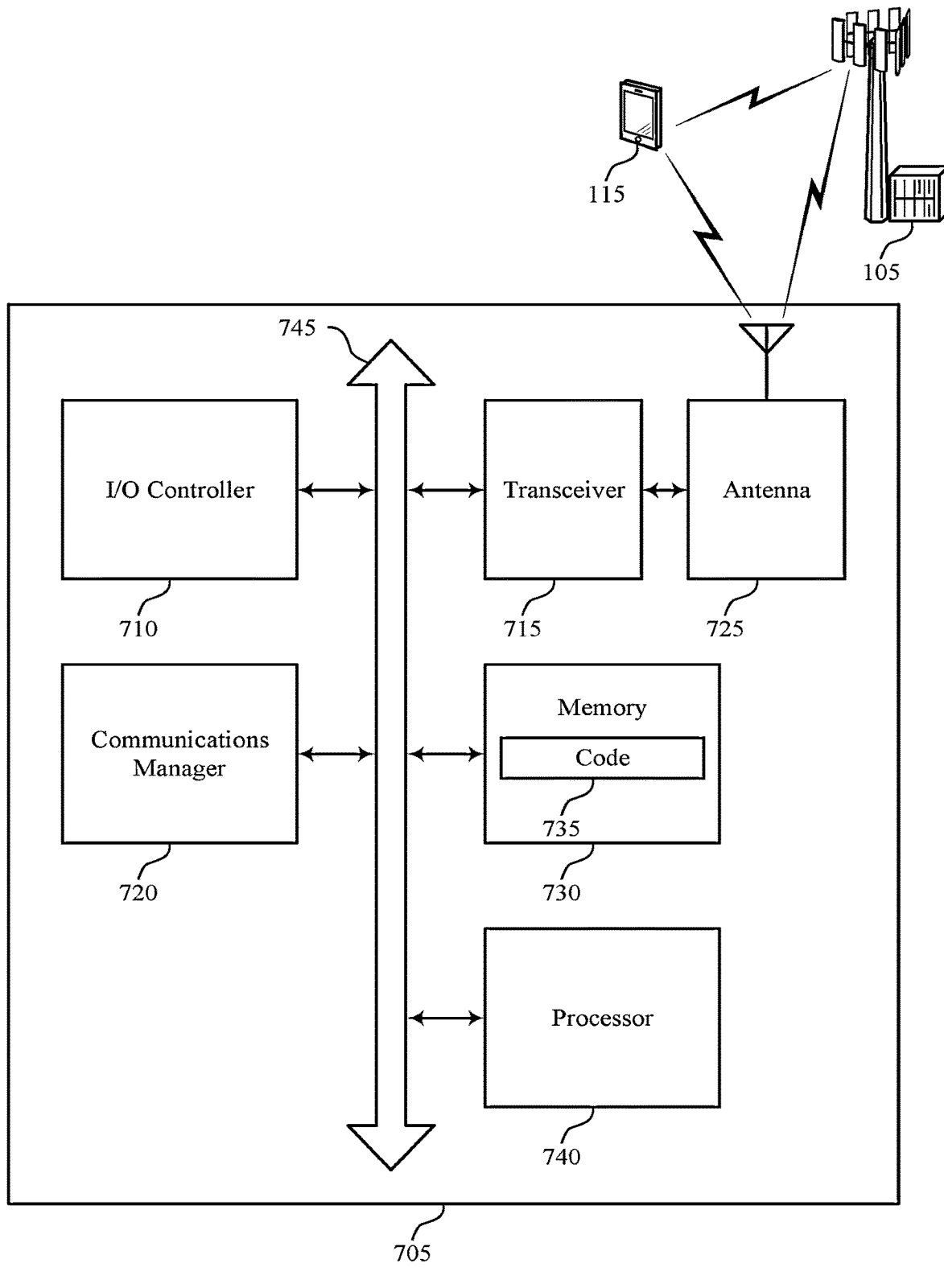
FIG. 7 illustrates a diagram of a system including a device that supports reference cell configuration in accordance with one or more aspects of the present disclosure.

FIG. 7 illustrates a diagram of a system 700 including a device 705 that supports reference cell configuration in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting reference cell configuration). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a signal indicating a delta cell configuration for each candidate cell in a set of one or more candidate cells, the set of one or more candidate cells associated with a reference cell configuration. The communications manager 720 may be configured as or otherwise support a means for monitoring for transmissions from candidate cells in the set of one or more candidate cells to identify a target cell, the target cell including a candidate cell from the set of one or more candidate cells. The communications manager 720 may be configured as or otherwise support a means for performing a cell mobility procedure with the target cell using the delta cell configuration of the candidate cell and the reference cell configuration of the set of one or more candidate cells.

By including or configuring the communications manager 720 in accordance with examples as described herein, the device 705 may support techniques for more efficient cell configuration signaling that reduces latency by leveraging similarities between candidate cells in a set of candidate cells. This may include configuring a UE with a reference cell configuration for the set of candidate cells and delta cell configurations for some or all of the candidate cells in the set.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of reference cell configuration as described herein, or the processor 740 and the memory 730 may be otherwise configured to perform or support such operations.

Figure 8:
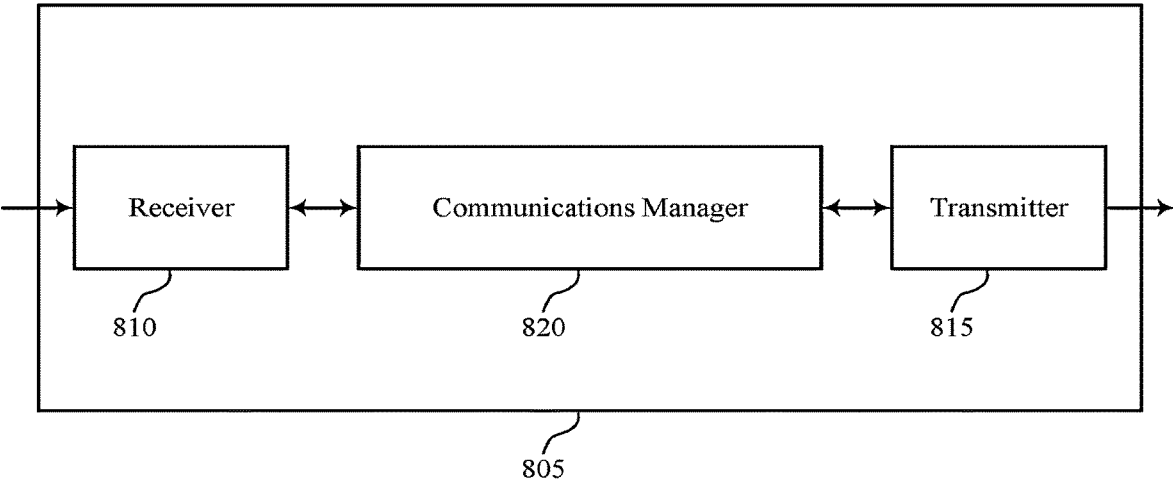
FIGS. 8 and 9 illustrate block diagrams of devices that support reference cell configuration in accordance with one or more aspects of the present disclosure.

FIG. 8 illustrates a block diagram 800 of a device 805 that supports reference cell configuration in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of reference cell configuration as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network device in accordance with examples as disclosed herein. For example, the communications manager 820 may be configured as or otherwise support a means for determining a reference cell configuration for a set of one or more candidate cells of a UE and a delta cell configuration for each candidate cell in the set of one or more candidate cells, the delta cell configuration of each candidate cell based on the reference cell configuration. The communications manager 820 may be configured as or otherwise support a means for transmitting a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for more efficient cell configuration signaling that reduces latency by leveraging similarities between candidate cells in a set of candidate cells. This may include configuring a UE with a reference cell configuration for the set of candidate cells and delta cell configurations for some or all of the candidate cells in the set.

Figure 9:
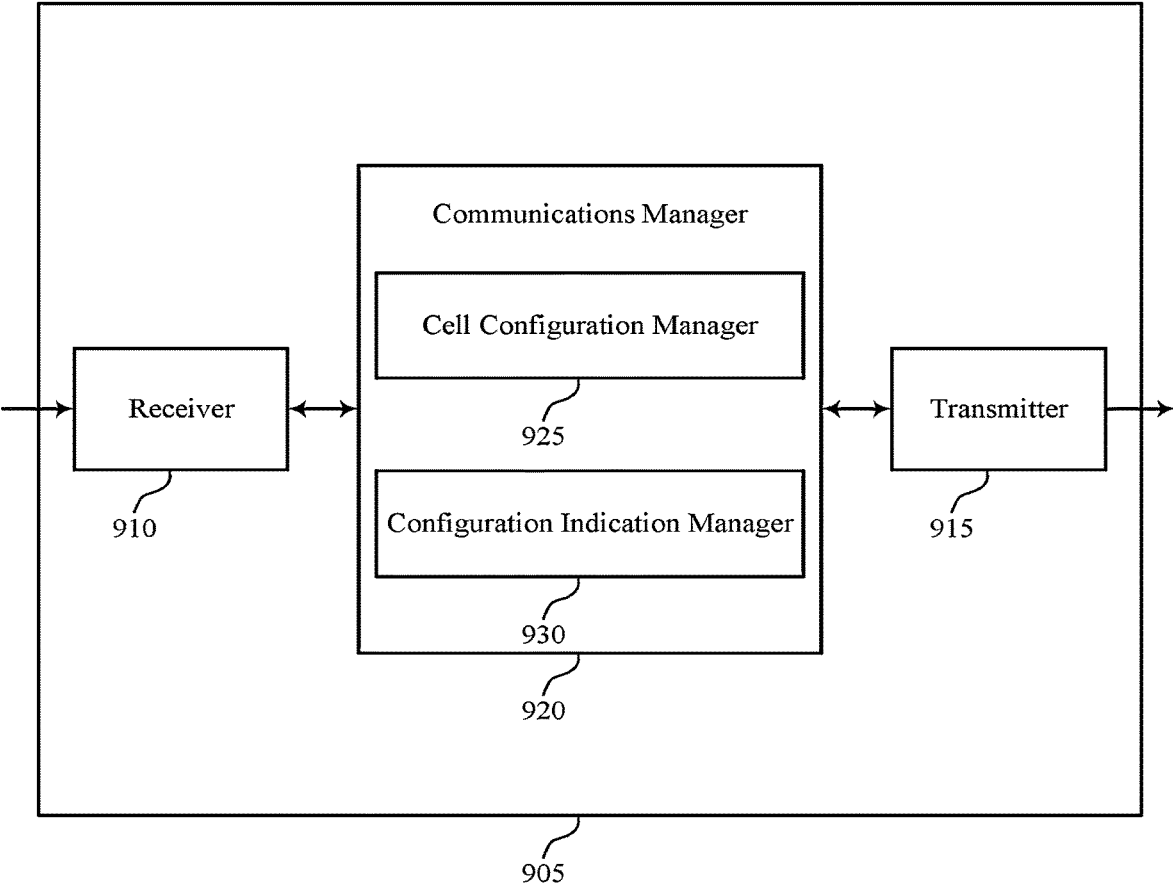
Figure 9:

FIG. 9 illustrates a block diagram 900 of a device 905 that supports reference cell configuration in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of reference cell configuration as described herein. For example, the communications manager 920 may include a cell configuration manager 925 a configuration indication manager 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network device in accordance with examples as disclosed herein. The cell configuration manager 925 may be configured as or otherwise support a means for determining a reference cell configuration for a set of one or more candidate cells of a UE and a delta cell configuration for each candidate cell in the set of one or more candidate cells, the delta cell configuration of each candidate cell based on the reference cell configuration. The configuration indication manager 930 may be configured as or otherwise support a means for transmitting a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration.

Figure 10:
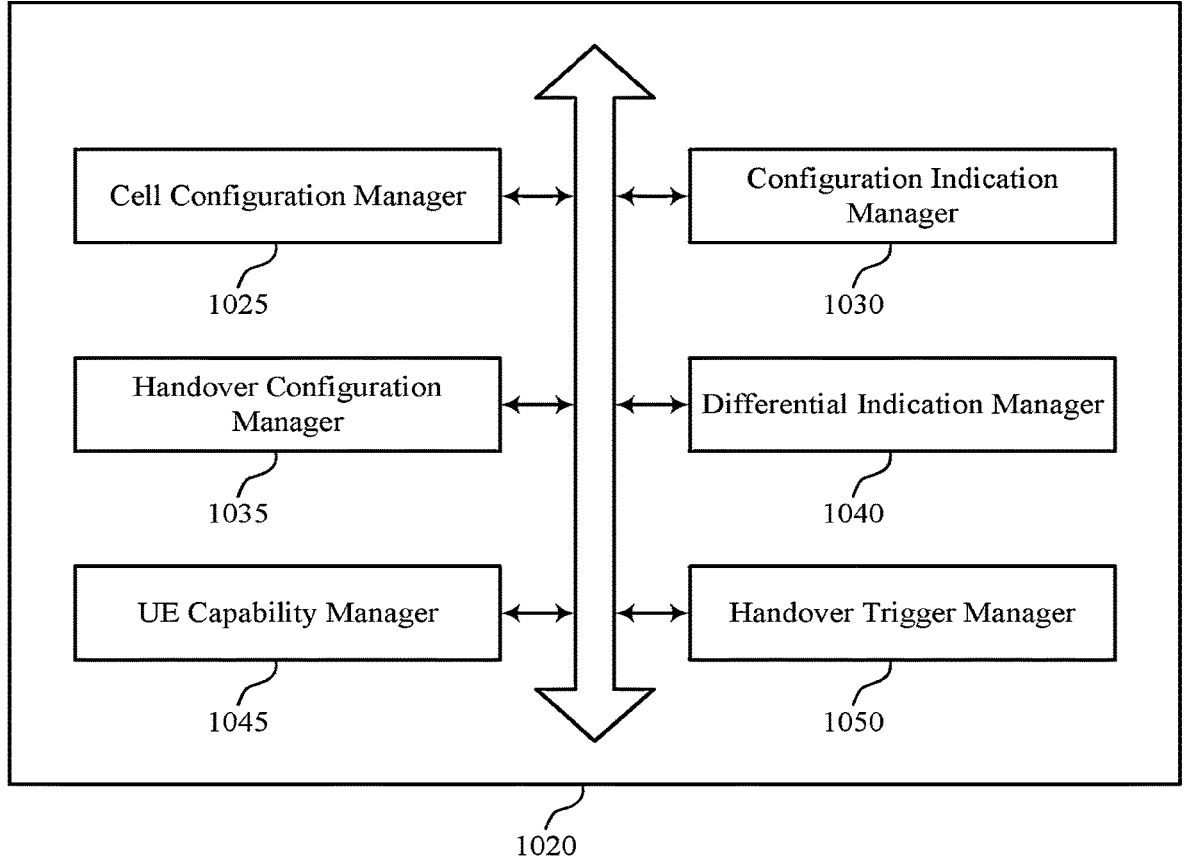
FIG. 10 illustrates a block diagram of a communications manager that supports reference cell configuration in accordance with one or more aspects of the present disclosure.

FIG. 10 illustrates a block diagram 1000 of a communications manager 1020 that supports reference cell configuration in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of reference cell configuration as described herein. For example, the communications manager 1020 may include a cell configuration manager 1025, a configuration indication manager 1030, a handover configuration manager 1035, a differential indication manager 1040, a UE capability manager 1045, a handover trigger manager 1050, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network device in accordance with examples as disclosed herein. The cell configuration manager 1025 may be configured as or otherwise support a means for determining a reference cell configuration for a set of one or more candidate cells of a UE and a delta cell configuration for each candidate cell in the set of one or more candidate cells, the delta cell configuration of each candidate cell based on the reference cell configuration. The configuration indication manager 1030 may be configured as or otherwise support a means for transmitting a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration.

In some examples, the handover configuration manager 1035 may be configured as or otherwise support a means for indicating the reference cell configuration, but not the delta cell configuration of the target cell to the UE, where the UE performing the cell mobility procedure with the target cell includes the UE using the reference cell configuration for the target cell.

In some examples, the handover configuration manager 1035 may be configured as or otherwise support a means for indicating the reference cell configuration and the delta cell configuration of the target cell to the UE, where the UE performing the cell mobility procedure with the target cell includes the UE using the delta cell configuration and the reference cell configuration for the target cell.

In some examples, the reference cell configuration includes a per-cell reference cell configuration where a set of parameters of the reference cell configuration are used as a corresponding set of parameters of the delta cell configuration or a per-parameter reference cell configuration where one or more parameters of the delta cell configuration are indicated as differential values relative to a corresponding one or more parameters of the reference cell configuration.

In some examples, the handover configuration manager 1035 may be configured as or otherwise support a means for setting a bit in the signal to indicate that the one or more parameters of the delta cell configuration as differential values relative to a corresponding one or more parameters of the reference cell configuration.

In some examples, the differential indication manager 1040 may be configured as or otherwise support a means for determining that a second parameter is not indicated in the reference cell configuration, the second parameter associated with a first parameter. In some examples, the differential indication manager 1040 may be configured as or otherwise support a means for refraining, based on the second parameter not being indicated, from indicating the first parameter in the delta cell configuration.

In some examples, the differential indication manager 1040 may be configured as or otherwise support a means for indicating a first parameter in the reference cell configuration, the delta cell configuration, or both, where the first parameter is associated with a second parameter. In some examples, the differential indication manager 1040 may be configured as or otherwise support a means for indicating the second parameter in the reference cell configuration, the delta cell configuration, or both, based on the first parameter being indicated.

In some examples, the differential indication manager 1040 may be configured as or otherwise support a means for refraining from indicating a first parameter in the delta cell configuration, where the first parameter is associated with a second parameter, where the first parameter is determined based on the second parameter being indicated in the reference cell configuration.

In some examples, the UE capability manager 1045 may be configured as or otherwise support a means for receiving a UE capability message indicating a supported maximum number of delta cell configurations and reference cell configurations on a per-bandwidth basis, for all supported bandwidths, or both.

In some examples, the UE capability manager 1045 may be configured as or otherwise support a means for receiving a UE capability message indicating a first supported maximum number of delta cell configurations and a second supported maximum number of reference cell configurations on a per-bandwidth basis, for all supported bandwidths, or both.

In some examples, the handover trigger manager 1050 may be configured as or otherwise support a means for transmitting a trigger signal to the UE initiating the cell mobility procedure with the target cell, where the cell mobility procedure is performed based on the trigger signal.

In some examples, the trigger signal identifies the reference cell configuration from a set of available reference cell configurations to be used during the cell mobility procedure.

Figure 11:
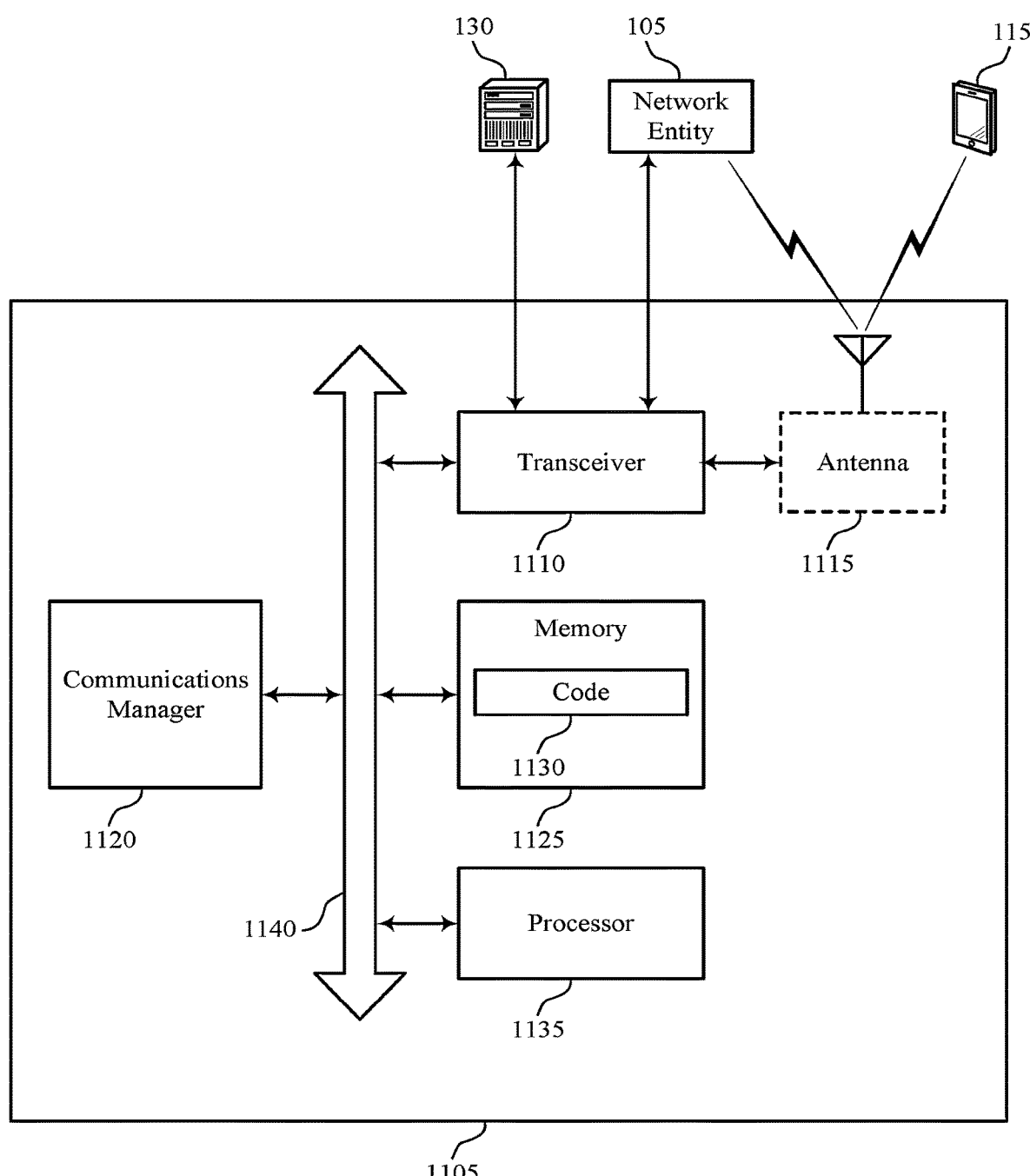
FIG. 11 illustrates a diagram of a system including a device that supports reference cell configuration in accordance with one or more aspects of the present disclosure.

FIG. 11 illustrates a diagram of a system 1100 including a device 1105 that supports reference cell configuration in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting reference cell configuration). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor

1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network device in accordance with examples as disclosed herein. For example, the communications manager 1120 may be configured as or otherwise support a means for determining a reference cell configuration for a set of one or more candidate cells of a UE and a delta cell configuration for each candidate cell in the set of one or more candidate cells, the delta cell configuration of each candidate cell based on the reference cell configuration. The communications manager 1120 may be configured as or otherwise support a means for transmitting a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration.

By including or configuring the communications manager 1120 in accordance with examples as described herein, the device 1105 may support techniques for more efficient cell configuration signaling that reduces latency by leveraging similarities between candidate cells in a set of candidate cells. This may include configuring a UE with a reference cell configuration for the set of candidate cells and delta cell configurations for some or all of the candidate cells in the set.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of reference cell configuration as described herein, or the processor 1135 and the memory 1125 may be otherwise configured to perform or support such operations.

FIG. 12 illustrates a flowchart showing a method 1200 that supports reference cell configuration in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a signal indicating a delta cell configuration for each candidate cell in a set of one or more candidate cells, the set of one or more candidate cells associated with a reference cell configuration. The operations of 1205 may be performed in accordance with examples as disclosed herein. In some examples, aspects of the operations of 1205 may be performed by a cell configuration manager 625 as described with reference to FIG. 6.

At 1210, the method may include monitoring for transmissions from candidate cells in the set of one or more candidate cells to identify a target cell, the target cell including a candidate cell from the set of one or more candidate cells. The operations of 1210 may be performed in accordance with examples as disclosed herein. In some examples, aspects of the operations of 1210 may be performed by a target cell manager 630 as described with reference to FIG. 6.

At 1215, the method may include performing a cell mobility procedure with the target cell using the delta cell configuration of the candidate cell and the reference cell configuration of the set of one or more candidate cells. The operations of 1215 may be performed in accordance with examples as disclosed herein. In some examples, aspects of the operations of 1215 may be performed by a mobility manager 635 as described with reference to FIG. 6.

FIG. 13 illustrates a flowchart showing a method 1300 that supports reference cell configuration in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a signal indicating a delta cell configuration for each candidate cell in a set of one or more candidate cells, the set of one or more candidate cells associated with a reference cell configuration. The operations of 1305 may be performed in accordance with examples as disclosed herein. In some examples, aspects of the operations of 1305 may be performed by a cell configuration manager 625 as described with reference to FIG. 6.

At 1310, the method may include monitoring for transmissions from candidate cells in the set of one or more candidate cells to identify a target cell, the target cell including a candidate cell from the set of one or more candidate cells. The operations of 1310 may be performed in accordance with examples as disclosed herein. In some examples, aspects of the operations of 1310 may be performed by a target cell manager 630 as described with reference to FIG. 6.

At 1315, the method may include performing a cell mobility procedure with the target cell using the delta cell configuration of the candidate cell and the reference cell configuration of the set of one or more candidate cells. The operations of 1315 may be performed in accordance with examples as disclosed herein. In some examples, aspects of the operations of 1315 may be performed by a mobility manager 635 as described with reference to FIG. 6.

At 1320, the method may include determining that the delta cell configuration of the candidate cell is not configured for the UE, where performing the cell mobility procedure with target cell includes using the reference cell configuration for the target cell. The operations of 1320 may be performed in accordance with examples as disclosed herein. In some examples, aspects of the operations of 1320 may be performed by a handover configuration manager 640 as described with reference to FIG. 6.

FIG. 14 illustrates a flowchart showing a method 1400 that supports reference cell configuration in accordance with one or more aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving a signal indicating a delta cell configuration for each candidate cell in a set of one or more candidate cells, the set of one or more candidate cells associated with a reference cell configuration. The operations of 1405 may be performed in accordance with examples as disclosed herein. In some examples, aspects of the operations of 1405 may be performed by a cell configuration manager 625 as described with reference to FIG. 6.

At 1410, the method may include monitoring for transmissions from candidate cells in the set of one or more candidate cells to identify a target cell, the target cell including a candidate cell from the set of one or more candidate cells. The operations of 1410 may be performed in accordance with examples as disclosed herein. In some examples, aspects of the operations of 1410 may be performed by a target cell manager 630 as described with reference to FIG. 6.

At 1415, the method may include performing a cell mobility procedure with the target cell using the delta cell configuration of the candidate cell and the reference cell configuration of the set of one or more candidate cells. The operations of 1415 may be performed in accordance with examples as disclosed herein. In some examples, aspects of the operations of 1415 may be performed by a mobility manager 635 as described with reference to FIG. 6.

At 1420, the method may include determining that the delta cell configuration of the candidate cell includes one or more differential parameters relative to a corresponding one or more reference parameters of the reference cell configuration, where performing the cell mobility procedure with the target cell includes using the one or more differential parameters of the delta cell configuration and the corresponding one or more reference parameters of the reference cell configuration for the target cell. The operations of 1420 may be performed in accordance with examples as disclosed herein. In some examples, aspects of the operations of 1420 may be performed by a handover configuration manager 640 as described with reference to FIG. 6.

FIG. 15 illustrates a flowchart showing a method 1500 that supports reference cell configuration in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include determining a reference cell configuration for a set of one or more candidate cells of a UE and a delta cell configuration for each candidate cell in the set of one or more candidate cells, the delta cell configuration of each candidate cell based on the reference cell configuration. The operations of 1505 may be performed in accordance with examples as disclosed herein. In some examples, aspects of the operations of 1505 may be performed by a cell configuration manager 1025 as described with reference to FIG. 10.

At 1510, the method may include transmitting a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration. The operations of 1510 may be performed in accordance with examples as disclosed herein. In some examples, aspects of the operations of 1510 may be performed by a configuration indication manager 1030 as described with reference to FIG. 10.

FIG. 16 illustrates a flowchart showing a method 1600 that supports reference cell configuration in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include determining a reference cell configuration for a set of one or more candidate cells of a UE and a delta cell configuration for each candidate cell in the set of one or more candidate cells, the delta cell configuration of each candidate cell based on the reference cell configuration. The operations of 1605 may be performed in accordance with examples as disclosed herein. In some examples, aspects of the operations of 1605 may be performed by a cell configuration manager 1025 as described with reference to FIG. 10.

At 1610, the method may include transmitting a signal to the UE indicating the reference cell configuration, the delta cell configuration for each candidate cell in the set of one or more candidate cells, or both, where the UE performs a cell mobility procedure with a target cell from the set of one or more candidate cells based on the reference cell configuration. The operations of 1610 may be performed in accordance with examples as disclosed herein. In some examples, aspects of the operations of 1610 may be performed by a configuration indication manager 1030 as described with reference to FIG. 10.

At 1615, the method may include refraining from indicating a first parameter in the delta cell configuration, where the first parameter is associated with a second parameter, where the first parameter is determined based on the second parameter being indicated in the reference cell configuration. The operations of 1615 may be performed in accordance with examples as disclosed herein. In some examples, aspects of the operations of 1615 may be performed by a differential indication manager 1040 as described with reference to FIG. 10.

The following provides an overview of aspects of the present disclosure:

Aspect 1: A method for wireless communication at a UE, comprising: receiving a signal indicating a delta cell configuration for each candidate cell in a set of one or more candidate cells, the set of one or more candidate cells associated with a reference cell configuration; monitoring for transmissions from candidate cells in the set of one or more candidate cells to identify a target cell, the target cell comprising a candidate cell from the set of one or more candidate cells; and performing a cell mobility procedure with the target cell using the delta cell configuration of the candidate cell and the reference cell configuration of the set of one or more candidate cells.

Aspect 2: The method of aspect 1, further comprising: determining that the delta cell configuration of the candidate cell is not configured for the UE, wherein performing the cell mobility procedure with target cell comprises using the reference cell configuration for the target cell.

Aspect 3: The method of any of aspects 1 through 2, further comprising: determining that the delta cell configuration of the candidate cell comprises one or more differential parameters relative to a corresponding one or more reference parameters of the reference cell configuration, wherein performing the cell mobility procedure with the target cell comprises using the one or more differential parameters of the delta cell configuration and the corresponding one or more reference parameters of the reference cell configuration for the target cell.

Aspect 4: The method of any of aspects 1 through 3, wherein the reference cell configuration comprises a per-cell reference cell configuration where a set of parameters of the reference cell configuration are used as a corresponding set of parameters of the delta cell configuration or a per-parameter reference cell configuration where one or more parameters of the delta cell configuration are indicated as differential values relative to a corresponding one or more parameters of the reference cell configuration.

Aspect 5: The method of aspect 4, further comprising: determining, based at least in part on a bit indicated in the delta cell configuration, that the one or more parameters of the delta cell configuration are indicated as differential values relative to a corresponding one or more parameters of the reference cell configuration.

Aspect 6: The method of any of aspects 1 through 5, further comprising: determining that a first parameter is indicated in the reference cell configuration, the delta cell configuration, or both, wherein the first parameter is associated with a second parameter; and determining that the second parameter is indicated in the reference cell configuration, the delta cell configuration, or both, based at least in part on the first parameter being indicated.

Aspect 7: The method of any of aspects 1 through 6, further comprising: determining that a first parameter is not indicated in the delta cell configuration, wherein the first parameter is associated with a second parameter; and determining, based at least in part on the first parameter not being indicated, the first parameter based at least in part on the second parameter indicated in the reference cell configuration.

Aspect 8: The method of any of aspects 1 through 7, further comprising: transmitting a UE capability message indicating a supported maximum number of delta cell configurations and reference cell configurations on a per-bandwidth basis, for all supported bandwidths, or both.

Aspect 9: The method of any of aspects 1 through 8, further comprising: transmitting a UE capability message indicating a first supported maximum number of delta cell configurations and a second supported maximum number of reference cell configurations on a per-bandwidth basis, for all supported bandwidths, or both.

Aspect 10: The method of any of aspects 1 through 9, further comprising: receiving a trigger signal initiating the cell mobility procedure with the target cell, wherein the cell mobility procedure is performed based at least in part on the trigger signal.

Aspect 11: The method of aspect 10, wherein the trigger signal identifies the reference cell configuration from a set of available reference cell configurations to be used during the cell mobility procedure.

Aspect 12: A method for wireless communication at a network device, comprising: determining a reference cell configuration for a set of one or more candidate cells of a UE and a delta cell configuration for each candidate cell in the set of one or more candidate cells, the delta cell configuration of each candidate cell based at least in part on the reference cell configuration; and transmitting a signal to the UE indicating the reference cell configuration, the delta cell configuration for each candidate cell in the set of one or more candidate cells, or both, wherein the UE performs a cell mobility procedure with a target cell from the set of one or more candidate cells based at least in part on the reference cell configuration.

Aspect 13: The method of aspect 12, further comprising: indicating the reference cell configuration, but not the delta cell configuration of the target cell to the UE, wherein the UE performing the cell mobility procedure with the target cell comprises the UE using the reference cell configuration for the target cell.

Aspect 14: The method of any of aspects 12 through 13, further comprising: indicating the reference cell configuration and the delta cell configuration of the target cell to the UE, wherein the UE performing the cell mobility procedure with the target cell comprises the UE using the delta cell configuration and the reference cell configuration for the target cell.

Aspect 15: The method of any of aspects 12 through 14, wherein the reference cell configuration comprises a per-cell reference cell configuration where a set of parameters of the reference cell configuration are used as a corresponding set of parameters of the delta cell configuration or a per-parameter reference cell configuration where one or more parameters of the delta cell configuration are indicated as differential values relative to a corresponding one or more parameters of the reference cell configuration.

Aspect 16: The method of aspect 15, further comprising: setting a bit in the signal to indicate that the one or more parameters of the delta cell configuration as differential values relative to a corresponding one or more parameters of the reference cell configuration.

Aspect 17: The method of any of aspects 12 through 16, further comprising: determining that a second parameter is not indicated in the reference cell configuration, the second parameter associated with a first parameter; and refraining, based at least in part on the second parameter not being indicated, from indicating the first parameter in the delta cell configuration.

Aspect 18: The method of any of aspects 12 through 17, further comprising: indicating a first parameter in the reference cell configuration, the delta cell configuration, or both, wherein the first parameter is associated with a second parameter; and indicating the second parameter in the reference cell configuration, the delta cell configuration, or both, based at least in part on the first parameter being indicated.

Aspect 19: The method of any of aspects 12 through 18, further comprising: refraining from indicating a first parameter in the delta cell configuration, wherein the first parameter is associated with a second parameter, wherein the first parameter is determined based at least in part on the second parameter being indicated in the reference cell configuration.

Aspect 20: The method of any of aspects 12 through 19, further comprising: receiving a UE capability message indicating a supported maximum number of delta cell configurations and reference cell configurations on a per-bandwidth basis, for all supported bandwidths, or both.

Aspect 21: The method of any of aspects 12 through 20, further comprising: receiving a UE capability message indicating a first supported maximum number of delta cell configurations and a second supported maximum number of reference cell configurations on a per-bandwidth basis, for all supported bandwidths, or both.

Aspect 22: The method of any of aspects 12 through 21, further comprising: transmitting a trigger signal to the UE initiating the cell mobility procedure with the target cell, wherein the cell mobility procedure is performed based at least in part on the trigger signal.

Aspect 23: The method of aspect 22, wherein the trigger signal identifies the reference cell configuration from a set of available reference cell configurations to be used during the cell mobility procedure.

Aspect 24: An apparatus for wireless communication at a UE, comprising a processor; memory coupled with the processor; and instructions stored in the memory and executable by the processor to cause the apparatus to perform a method of any of aspects 1 through 11.

Aspect 25: An apparatus for wireless communication at a UE, comprising at least one means for performing a method of any of aspects 1 through 11.

Aspect 26: A non-transitory computer-readable medium storing code for wireless communication at a UE, the code comprising instructions executable by a processor to perform a method of any of aspects 1 through 11.

Aspect 27: An apparatus for wireless communication at a network device, comprising a processor; memory coupled with the processor; and instructions stored in the memory and executable by the processor to cause the apparatus to perform a method of any of aspects 12 through 23.

Aspect 28: An apparatus for wireless communication at a network device, comprising at least one means for performing a method of any of aspects 12 through 23.

Aspect 29: A non-transitory computer-readable medium storing code for wireless communication at a network device, the code comprising instructions executable by a processor to perform a method of any of aspects 12 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
a processor;
memory coupled with the processor; and
instructions stored in the memory and executable by the processor to cause the UE to:
receive a signal indicating a delta cell configuration for each candidate cell in a set of one or more candidate cells, the set of one or more candidate cells associated with a reference cell configuration, wherein the reference cell configuration defines one or more reference parameters that are shared among the set of one or more candidate cells;
monitor for transmissions from candidate cells in the set of one or more candidate cells to identify a target cell, the target cell comprising a candidate cell from the set of one or more candidate cells; and
perform a cell mobility procedure with the target cell using the delta cell configuration of the candidate cell and the reference cell configuration of the set of one or more candidate cells.

2. The apparatus of claim 1, wherein the instructions are further executable by the processor to cause the UE to:
determine that the delta cell configuration of the candidate cell is not configured for the UE, wherein performing the cell mobility procedure with target cell comprises using the reference cell configuration for the target cell.

3. The apparatus of claim 1, wherein the instructions are further executable by the processor to cause the UE to:
determine that the delta cell configuration of the candidate cell comprises one or more differential parameters relative to the one or more reference parameters of the reference cell configuration, wherein performing the cell mobility procedure with the target cell comprises using the one or more differential parameters of the delta cell configuration and one or more reference parameters of the reference cell configuration for the target cell.

4. The apparatus of claim 1, wherein the reference cell configuration comprises a per-cell reference cell configuration where a set of parameters of the reference cell configuration are used as a corresponding set of parameters of the delta cell configuration or a per-parameter reference cell configuration where one or more parameters of the delta cell configuration are indicated as differential values relative to a corresponding one or more parameters of the reference cell configuration.

5. The apparatus of claim 4, wherein the instructions are further executable by the processor to cause the UE to:
determine, based at least in part on a bit indicated in the delta cell configuration, that the one or more parameters of the delta cell configuration are indicated as differential values relative to the corresponding one or more parameters of the reference cell configuration.

6. The apparatus of claim 1, wherein the instructions are further executable by the processor to cause the UE to:
determine that a first parameter is indicated in the reference cell configuration, the delta cell configuration, or both, wherein the first parameter is associated with a second parameter; and
determine that the second parameter is indicated in the reference cell configuration, the delta cell configuration, or both, based at least in part on the first parameter being indicated.

7. The apparatus of claim 1, wherein the instructions are further executable by the processor to cause the UE to:
determine that a first parameter is not indicated in the delta cell configuration, wherein the first parameter is associated with a second parameter; and
determine, based at least in part on the first parameter not being indicated, the first parameter based at least in part on the second parameter indicated in the reference cell configuration.

8. The apparatus of claim 1, wherein the instructions are further executable by the processor to cause the UE to:
transmit a UE capability message indicating a supported maximum number of delta cell configurations and reference cell configurations on a per-bandwidth basis, for all supported bandwidths, or both.

9. The apparatus of claim 1, wherein the instructions are further executable by the processor to cause the UE to:
transmit a UE capability message indicating a first supported maximum number of delta cell configurations and a second supported maximum number of reference cell configurations on a per-bandwidth basis, for all supported bandwidths, or both.

10. The apparatus of claim 1, wherein the instructions are further executable by the processor to cause the UE to:

receive a trigger signal initiating the cell mobility procedure with the target cell, wherein the cell mobility procedure is performed based at least in part on the trigger signal.

11. The apparatus of claim 10, wherein the trigger signal identifies the reference cell configuration from a set of available reference cell configurations to be used during the cell mobility procedure.

12. An apparatus for wireless communication at a network device, comprising:

a processor;

memory coupled with the processor; and instructions stored in the memory and executable by the processor to cause the network device to:

determine a reference cell configuration for a set of one or more candidate cells of a user equipment (UE) and a delta cell configuration for each candidate cell in the set of one or more candidate cells, the delta cell configuration of each candidate cell based at least in part on the reference cell configuration, wherein the reference cell configuration defines one or more reference parameters that are shared among the set of one or more candidate cells; and transmit a signal to the UE indicating the reference cell configuration, the delta cell configuration for each candidate cell in the set of one or more candidate cells, or both, wherein the UE performs a cell mobility procedure with a target cell from the set of one or more candidate cells based at least in part on the reference cell configuration.

13. The apparatus of claim 12, wherein the instructions are further executable by the processor to cause the network device to:

indicate the reference cell configuration, but not the delta cell configuration of the target cell to the UE, wherein the UE performing the cell mobility procedure with the target cell comprises the UE using the reference cell configuration for the target cell.

14. The apparatus of claim 12, wherein the instructions are further executable by the processor to cause the network device to:

indicate the reference cell configuration and the delta cell configuration of the target cell to the UE, wherein the UE performing the cell mobility procedure with the target cell comprises the UE using the delta cell configuration and the reference cell configuration for the target cell.

15. The apparatus of claim 12, wherein the reference cell configuration comprises a per-cell reference cell configuration where a set of parameters of the reference cell configuration are used as a corresponding set of parameters of the delta cell configuration or a per-parameter reference cell configuration where one or more parameters of the delta cell configuration are indicated as differential values relative to a corresponding one or more parameters of the reference cell configuration.

16. The apparatus of claim 15, wherein the instructions are further executable by the processor to cause the network device to:

set a bit in the signal to indicate that the one or more parameters of the delta cell configuration as differential values relative to the corresponding one or more parameters of the reference cell configuration.

17. The apparatus of claim 12, wherein the instructions are further executable by the processor to cause the network device to:

determine that a second parameter is not indicated in the reference cell configuration, the second parameter associated with a first parameter; and refraining, based at least in part on the second parameter not being indicated, from indicating the first parameter in the delta cell configuration.

18. The apparatus of claim 12, wherein the instructions are further executable by the processor to cause the network device to:

indicate a first parameter in the reference cell configuration, the delta cell configuration, or both, wherein the first parameter is associated with a second parameter; and indicate the second parameter in the reference cell configuration, the delta cell configuration, or both, based at least in part on the first parameter being indicated.

19. The apparatus of claim 12, wherein the instructions are further executable by the processor to cause the network device to:

refrain from indicating a first parameter in the delta cell configuration, wherein the first parameter is associated with a second parameter, wherein the first parameter is determined based at least in part on the second parameter being indicated in the reference cell configuration.

20. The apparatus of claim 12, wherein the instructions are further executable by the processor to cause the network device to:

receive a UE capability message indicating a supported maximum number of delta cell configurations and reference cell configurations on a per-bandwidth basis, for all supported bandwidths, or both.

21. The apparatus of claim 12, wherein the instructions are further executable by the processor to cause the network device to:

receive a UE capability message indicating a first supported maximum number of delta cell configurations and a second supported maximum number of reference cell configurations on a per-bandwidth basis, for all supported bandwidths, or both.

22. The apparatus of claim 12, wherein the instructions are further executable by the processor to cause the network device to:

transmit a trigger signal to the UE initiating the cell mobility procedure with the target cell, wherein the cell mobility procedure is performed based at least in part on the trigger signal.

23. The apparatus of claim 22, wherein the trigger signal identifies the reference cell configuration from a set of available reference cell configurations to be used during the cell mobility procedure.

24. A method for wireless communication at a user equipment (UE), comprising:

receiving a signal indicating a delta cell configuration for each candidate cell in a set of one or more candidate cells, the set of one or more candidate cells associated with a reference cell configuration, wherein the reference cell configuration defines one or more reference parameters that are shared among the set of one or more candidate cells;

monitoring for transmissions from candidate cells in the set of one or more candidate cells to identify a target cell, the target cell comprising a candidate cell from the set of one or more candidate cells; and performing a cell mobility procedure with the target cell using the delta cell configuration of the candidate cell and the reference cell configuration of the set of one or more candidate cells.

25. The method of claim 24, further comprising:

determining that the delta cell configuration of the candidate cell is not configured for the UE, wherein performing the cell mobility procedure with target cell comprises using the reference cell configuration for the target cell.

26. The method of claim 24, further comprising:

determining that the delta cell configuration of the candidate cell comprises one or more differential parameters relative to the one or more reference parameters of the reference cell configuration, wherein performing the cell mobility procedure with the target cell comprises using the one or more differential parameters of the delta cell configuration and one or more reference parameters of the reference cell configuration for the target cell.

27. The method of claim 24, wherein the reference cell configuration comprises a per-cell reference cell configuration where a set of parameters of the reference cell configuration are used as a corresponding set of parameters of the delta cell configuration or a per-parameter reference cell configuration where one or more parameters of the delta cell configuration are indicated as differential values relative to a corresponding one or more parameters of the reference cell configuration.

28. A method for wireless communication at a network device, comprising:

determining a reference cell configuration for a set of one or more candidate cells of a user equipment (UE) and a delta cell configuration for each candidate cell in the set of one or more candidate cells, the delta cell configuration of each candidate cell based at least in part on the reference cell configuration, wherein the reference cell configuration defines one or more reference parameters that are shared among the set of one or more candidate cells; and transmitting a signal to the UE indicating the reference cell configuration, the delta cell configuration for each candidate cell in the set of one or more candidate cells, or both, wherein the UE performs a cell mobility procedure with a target cell from the set of one or more candidate cells based at least in part on the reference cell configuration.

29. The method of claim 28, further comprising:

indicating the reference cell configuration, but not the delta cell configuration of the target cell to the UE, wherein the UE performing the cell mobility procedure with the target cell comprises the UE using the reference cell configuration for the target cell.

30. The method of claim 28, further comprising:

indicating the reference cell configuration and the delta cell configuration of the target cell to the UE, wherein the UE performing the cell mobility procedure with the target cell comprises the UE using the delta cell configuration and the reference cell configuration for the target cell.

* * * * *